(12) United States Patent
Raghavan et al.

(10) Patent No.: US 12,237,893 B2
(45) Date of Patent: *Feb. 25, 2025

(54) BEAMFORMING CODEBOOK ADAPTATION FOR FLEXIBLE WIRELESS DEVICES

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Kobi Ravid, Closter, NJ (US); Yu-Chin Ou, San Diego, CA (US); Ozge Koymen, Princeton, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/865,776

(22) Filed: Jul. 15, 2022

(65) Prior Publication Data

US 2023/0006721 A1 Jan. 5, 2023

Related U.S. Application Data

(63) Continuation of application No. 16/680,161, filed on Nov. 11, 2019, now Pat. No. 11,394,437.

(Continued)

(51) Int. Cl.
*H04B 7/0456* (2017.01)
*H04B 7/06* (2006.01)
*H04L 5/00* (2006.01)

(52) U.S. Cl.
CPC ......... *H04B 7/0482* (2013.01); *H04B 7/0617* (2013.01); *H04B 7/0626* (2013.01); *H04B 7/0639* (2013.01); *H04L 5/0048* (2013.01)

(58) Field of Classification Search
CPC ... H04L 5/0055; H04L 5/0023; H04L 5/0048; H04L 5/0057; H04L 1/0026; H04L 1/186;
(Continued)

(56) References Cited

U.S. PATENT DOCUMENTS 9,363,683 B2 6/2016 Raghavan et al.
10,200,148 B1 2/2019 Gao et al.
(Continued)

FOREIGN PATENT DOCUMENTS

CN 104378190 A 2/2015
CN 107465433 A 12/2017
(Continued)

OTHER PUBLICATIONS

Apple: "Discussion on UE Feature List", 3GPP Draft, 3GPP TSG RAN WG1 Meeting #94, R1-1808610 Discussion on UE Feature List, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 11, 2018 (Aug. 11, 2018), XP051515987, 7 Pages, Retrieved from the Internet: URL: http://www.3gpp.org/ftp/tsg%5Fran/WG1%5FRL1/TSGR1%5F94/Docs/R1%2D1808610%2Ezip [retrieved on Aug. 11, 2018], p. 5-p. 6.
(Continued)

*Primary Examiner* — Khanh C Tran
(74) *Attorney, Agent, or Firm* — Holland & Hart LLP/QUALCOMM Incorporated

(57) ABSTRACT

Methods, systems, and devices for wireless communications are described. A codebook adaptation may be performed for a flexible user equipment (UEs) to determine a codebook for a physical configuration of the UE. For example, if the UE determines that the physical configuration does not correspond to a pre-loaded codebook in its memory, the UE may provide information about the physical configuration to a
(Continued)

base station to determine a corresponding codebook. Additionally, the UE may request that the base station provide channel information to assist with the codebook determination. In some cases, this request may indicate for the base station to allocate a specific number of channel state information reference signal symbols that the UE can use for the codebook determination. Additionally or alternatively, the UE may generate the codebook internally and then signal to the base station a request for a beam refinement procedure with the generated codebook.

51 Claims, 20 Drawing Sheets

Related U.S. Application Data

(60) Provisional application No. 62/780,127, filed on Dec. 14, 2018.

(58) Field of Classification Search
CPC ............ H04L 5/0016; H04L 1/0009; H04L 25/03343; H04B 7/0626; H04B 7/0417; H04B 17/318; H04B 7/0482; H04B 7/0617; H04B 7/04; H04B 7/0456; H04B 7/0478; H04B 17/382; H04B 7/0469; H04B 7/0639; H04B 7/0669; H04B 7/0678; H04B 7/0695
See application file for complete search history.

(56) References Cited

U.S. PATENT DOCUMENTS

| | | | |
|---|---|---|---|
| 11,070,279 B2 | 7/2021 | Raghavan et al. | |
| 11,108,452 B2 | 8/2021 | Bengtsson et al. | |
| 11,394,437 B2 | 7/2022 | Raghavan et al. | |
| 12,021,787 B2* | 6/2024 | Zhang | H04W 72/569 |
| 2002/0039914 A1 | 4/2002 | Hama et al. | |
| 2007/0232314 A1 | 10/2007 | Kolding et al. | |
| 2010/0064536 A1 | 3/2010 | Caskey et al. | |
| 2010/0297971 A1 | 11/2010 | Persson | |
| 2011/0199968 A1 | 8/2011 | Kim et al. | |
| 2012/0328031 A1* | 12/2012 | Pajukoski | H04B 7/0469 375/259 |
| 2013/0057432 A1 | 3/2013 | Rajagopal et al. | |
| 2013/0275077 A1 | 10/2013 | Kim et al. | |
| 2013/0301434 A1* | 11/2013 | Krishnamurthy | H04L 5/0053 370/252 |
| 2014/0177531 A1* | 6/2014 | Imamura | H04L 5/0048 370/328 |
| 2014/0240178 A1 | 8/2014 | Chun et al. | |
| 2014/0247796 A1 | 9/2014 | Ouchi et al. | |
| 2015/0050927 A1 | 2/2015 | Moisio et al. | |
| 2015/0085761 A1 | 3/2015 | Maltsev et al. | |
| 2015/0188653 A1* | 7/2015 | Hanks | H04L 5/0037 370/203 |
| 2016/0037541 A1 | 2/2016 | Kim et al. | |
| 2016/0295323 A1 | 10/2016 | Yliaho et al. | |
| 2016/0337021 A1 | 11/2016 | Sung et al. | |
| 2017/0038641 A1 | 2/2017 | Yamazaki | |
| 2017/0357292 A1 | 12/2017 | Cho et al. | |
| 2017/0373745 A1* | 12/2017 | Park | H04B 7/0639 |
| 2018/0102817 A1 | 4/2018 | Park et al. | |
| 2018/0115357 A1* | 4/2018 | Park | H04L 25/00 |
| 2018/0123664 A1 | 5/2018 | Li et al. | |
| 2018/0139780 A1* | 5/2018 | Kang | H04W 74/0808 |
| 2018/0183503 A1 | 6/2018 | Rahman et al. | |
| 2018/0227094 A1 | 8/2018 | Liu et al. | |
| 2018/0242319 A1 | 8/2018 | Akkarakaran et al. | |
| 2018/0287682 A1 | 10/2018 | Kwak et al. | |
| 2019/0090137 A1 | 3/2019 | Cutcher et al. | |
| 2019/0116467 A1 | 4/2019 | Belleschi et al. | |
| 2019/0140340 A1* | 5/2019 | Ramasamy | H01Q 1/2291 |
| 2019/0190569 A1* | 6/2019 | Nayeb Nazar | H04B 7/0639 |
| 2019/0190574 A1 | 6/2019 | Chen et al. | |
| 2019/0223065 A1 | 7/2019 | Lu et al. | |
| 2019/0364492 A1 | 11/2019 | Azizi et al. | |
| 2020/0107341 A1 | 4/2020 | Zhang et al. | |
| 2020/0145280 A1 | 5/2020 | Cirik et al. | |
| 2020/0195320 A1 | 6/2020 | Raghavan et al. | |
| 2020/0195336 A1 | 6/2020 | Raghavan et al. | |
| 2020/0205073 A1 | 6/2020 | Akkarakaran et al. | |
| 2020/0374730 A1 | 11/2020 | Gao et al. | |
| 2021/0344408 A1 | 11/2021 | Raghavan et al. | |
| 2023/0387988 A1* | 11/2023 | Ly | H04B 7/0478 |

FOREIGN PATENT DOCUMENTS

| | | | |
|---|---|---|---|
| EP | 2644002 | A1 | 10/2013 |
| EP | 2840816 | A1 | 2/2015 |
| WO | WO-2016010685 | A1 | 1/2016 |
| WO | WO2017197237 | A1 | 11/2017 |
| WO | WO-2018056789 | A1 | 3/2018 |
| WO | WO2018127560 | A1 | 7/2018 |

OTHER PUBLICATIONS

Huawei, et al., "Beam Measurement and Reporting", 3GPP Draft, 3GPP TSG RAN WG1 Meeting NR#3, R1-1715467, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 2, 2017, Sep. 17, 2017 (Sep. 17, 2017), XP051338935, 9 Pages, Retrieved from the Internet: URL:http://www.3gpp.org/ftp/Meetings_3GPP_SYNC/RAN1/Docs/, [retrieved on Sep. 17, 2017], Sections 1, 3.1, 4.4.
Intel Corporation: "On Codebook Based UL Transmission", 3GPP Draft, 3GPP TSG RAN WG1 Meeting #90, R1-1712537, On Codebook Based UL Transmission, 3rd Generation Partnership Project (3GPP), Mobile Competence Centre, 650, Route Des Lucioles, F06921 Sophia-Antipolis Cedex, France, vol. RAN WG1, No. Prague, P.R. Czechia, Aug. 21, 2017-Aug. 25, 2017, Aug. 20, 2017, XP051315353, 6 pages, Retrieved from the Internet: URL:http://www.3gpp.org/ftp/Meetings_3GPP_SYNC/RAN1/Docs/, [retrieved on Aug. 20, 2017].
International Preliminary Report on Patentability—PCT/US2019/061001 The International Bureau of WIPO—Geneva, Switzerland, dated Jun. 24, 2021.
International Preliminary Report on Patentability—PCT/US2019/061398 The International Bureau of WIPO—Geneva, Switzerland, dated Jun. 24, 2021.
International Search Report and Written Opinion—PCT/US2019/061001—ISA/EPO—dated Feb. 25, 2020.
International Search Report and Written Opinion—PCT/US2019/061398—ISA/EPO—dated Mar. 19, 2020.
NTT Docomo, "Technical Journal," Jul. 2017, vol. 19, No. 1, 48 pages.
Partial International Search Report—PCT/US2019/061398—ISA/EPO—dated Feb. 4, 2020.
Pradhan C., et al., "Joint Beamwidth and Energy Optimization for Multi-User Millimeter Wave Communications", 2018 IEEE International Conference on Communications Workshops (ICC Workshops), IEEE, May 20, 2018 (May 20, 2018), pp. 1-8, XP033369908, DOI: 10.1109/ICCW.2018.8403597, [retrieved on Jul. 3, 2018], Chapter IV.C, p. 5.
Taiwan Search Report—TW108141350—TIPO—dated Feb. 9, 2023.
European Search Report—EP24150945—Search Authority—Munich—Mar. 27, 2024.
OPPO: "Remaining Issues on Uplink Codebook Design", 3GPP TSG RAN WG1 Meeting #90bis, R1-1718024, Prague, Czech Republic, Oct. 9-13, 2017, 3 Pages.

* cited by examiner

BEAMFORMING CODEBOOK ADAPTATION FOR FLEXIBLE WIRELESS DEVICES

CROSS REFERENCE

The present application for patent is a Continuation of U.S. patent application Ser. No. 16/680,161 by RAGHAVAN et al., entitled "BEAMFORMING CODEBOOK ADAPTATION FOR FLEXIBLE WIRELESS DEVICES" filed Nov. 11, 2019, which claims the benefit of U.S. Provisional Patent Application No. 62/780,127 by RAGHAVAN et al., entitled "BEAMFORMING CODEBOOK ADAPTATION FOR FLEXIBLE WIRELESS DEVICES," filed Dec. 14, 2018, assigned to the assignee hereof, and which is expressly incorporated by reference herein.

INTRODUCTION

The following relates generally to wireless communications, and more specifically to beamforming for flexible wireless devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communications at a wireless device (e.g., a UE) is described. The method may include identifying a physical configuration of the wireless device, accessing a set of analog beamforming codebooks pre-loaded in a memory of the wireless device, determining the identified physical configuration fails to correspond to at least one analog beamforming codebook pre-loaded in the memory of the wireless device, transmitting, to a base station, signaling including an indication of the physical configuration of the wireless device and a request for channel information for a subsequent communication with the base station, the transmitting being based on the identified physical configuration failing to correspond to the at least one analog beamforming codebook pre-loaded in the memory of the wireless device, and receiving, from the base station, the channel information in response to the request.

An apparatus for wireless communications at a wireless device (e.g., a UE) is described. The apparatus may include a processor and memory coupled to the processor. The processor and the memory may be configured to cause the apparatus to identify a physical configuration of the wireless device, access a set of analog beamforming codebooks pre-loaded in a memory of the wireless device, determine the identified physical configuration fails to correspond to at least one analog beamforming codebook pre-loaded in the memory of the wireless device, transmit, to a base station, signaling including an indication of the physical configuration of the wireless device and a request for channel information for a subsequent communication with the base station, the transmitting being based on the identified physical configuration failing to correspond to the at least one analog beamforming codebook pre-loaded in the memory of the wireless device, and receive, from the base station, the channel information in response to the request.

Another apparatus for wireless communications at a wireless device (e.g., a UE) is described. The apparatus may include means for identifying a physical configuration of the wireless device, accessing a set of analog beamforming codebooks pre-loaded in a memory of the wireless device, determining the identified physical configuration fails to correspond to at least one analog beamforming codebook pre-loaded in the memory of the wireless device, transmitting, to a base station, signaling including an indication of the physical configuration of the wireless device and a request for channel information for a subsequent communication with the base station, the transmitting being based on the identified physical configuration failing to correspond to the at least one analog beamforming codebook pre-loaded in the memory of the wireless device, and receiving, from the base station, the channel information in response to the request.

A non-transitory computer-readable medium storing code for wireless communications at a wireless device (e.g., a UE) is described. The code may include instructions executable by a processor to identify a physical configuration of the wireless device, access a set of analog beamforming codebooks pre-loaded in a memory of the wireless device, determine the identified physical configuration fails to correspond to at least one analog beamforming codebook pre-loaded in the memory of the wireless device, transmit, to a base station, signaling including an indication of the physical configuration of the wireless device and a request for channel information for a subsequent communication with the base station, the transmitting being based on the identified physical configuration failing to correspond to the at least one analog beamforming codebook pre-loaded in the memory of the wireless device, and receive, from the base station, the channel information in response to the request.

Some examples of the method, apparatuses, and non-transitory computer-readable medium described herein may further include operations, features, means, or instructions for determining an analog beamforming codebook corresponding to the identified physical configuration based on the received channel information, where the analog beamforming codebook may be used for the subsequent communication with the base station while in the identified physical configuration.

In some examples of the method, apparatuses, and non-transitory computer-readable medium described herein, the request for channel information for subsequent communications with the base station includes a request for a set of contiguous channel state information reference signal (CSI-RS) resources for an analog beamforming codebook determination.

Some examples of the method, apparatuses, and non-transitory computer-readable medium described herein may further include operations, features, means, or instructions for receiving, from the base station, the set of contiguous CSI-RS resources, and determining an analog beamforming codebook corresponding to the identified physical configuration based on the set of contiguous CSI-RS resources, where the analog beamforming codebook may be used for the subsequent communication with the base station while in the identified physical configuration.

Some examples of the method, apparatuses, and non-transitory computer-readable medium described herein may further include operations, features, means, or instructions for using a set of sets of analog sampling beams over the set of contiguous CSI-RS resources to determine the analog beamforming codebook corresponding to the identified physical configuration.

In some examples of the method, apparatuses, and non-transitory computer-readable medium described herein, the indication of the identified physical configuration includes an explicit or an implicit indication of the physical configuration relative to past physical configurations of the wireless device.

In some examples of the method, apparatuses, and non-transitory computer-readable medium described herein, the indication of the identified physical configuration includes an indication of one or more antenna shapes, antenna subarrays, antenna dimensions, or a combination thereof for the physical configuration of the wireless device.

In some examples of the method, apparatuses, and non-transitory computer-readable medium described herein, the indication of the identified physical configuration includes a quantized indication with a finite size.

In some examples of the method, apparatuses, and non-transitory computer-readable medium described herein, the indication of the identified physical configuration includes information for a set of applications at a firmware layer, hardware layer, software layer, application layer, or a combination thereof for the wireless device.

Some examples of the method, apparatuses, and non-transitory computer-readable medium described herein may further include operations, features, means, or instructions for transmitting, to a central processing unit (CPU) within the wireless device, sensor information regarding the identified physical configuration, and generating, at the CPU, an analog beamforming codebook corresponding to the identified physical configuration based on the sensor information, where the analog beamforming codebook may be used for the subsequent communication with the base station while in the identified physical configuration.

Some examples of the method, apparatuses, and non-transitory computer-readable medium described herein may further include operations, features, means, or instructions for transmitting, to a modem and a radio frequency integrated circuit (RFIC) associated with the modem in the wireless device, an indication of the generated analog beamforming codebook.

Some examples of the method, apparatuses, and non-transitory computer-readable medium described herein may further include operations, features, means, or instructions for transmitting, to the base station, a beam refinement procedure request based on the generated analog beamforming codebook for the identified physical configuration, where the beam refinement procedure request includes the request for channel information.

In some examples of the method, apparatuses, and non-transitory computer-readable medium described herein, the sensor information includes information from a potentiometer, a gyro, or a combination thereof.

Some examples of the method, apparatuses, and non-transitory computer-readable medium described herein may further include operations, features, means, or instructions for deactivating one or more antennas based on the identified physical configuration.

In some examples of the method, apparatuses, and non-transitory computer-readable medium described herein, the identified physical configuration includes a set of antenna elements that forms an antenna array pattern that corresponds to the identified physical configuration.

In some examples of the method, apparatuses, and non-transitory computer-readable medium described herein, the pre-loaded analog beamforming codebooks may be associated with beamformed communications over a limited number of radio frequency chains with the base station, where the number of radio frequency chains may be smaller than a number of antenna elements of the wireless device.

In some examples of the method, apparatuses, and non-transitory computer-readable medium described herein, the pre-loaded analog beamforming codebooks may be stored in RFIC memory.

In some examples of the method, apparatuses, and non-transitory computer-readable medium described herein, the identified physical configuration includes a foldable state of the wireless device corresponding to different possible foldings of a flexible display unit.

A method of wireless communications at a base station is described. The method may include receiving, from a wireless device (e.g., a UE), signaling including an indication of a physical configuration for the wireless device, receiving, from the wireless device, a request for channel information corresponding to the identified physical configuration, and transmitting, to the wireless device, the channel information in response to the request.

An apparatus for wireless communications at a base station is described. The apparatus may include a processor and memory coupled to the processor. The processor and the memory may be configured to cause the apparatus to receive, from a wireless device (e.g., a UE), signaling including an indication of a physical configuration for the wireless device, receive, from the wireless device, a request for channel information corresponding to the identified physical configuration, and transmit, to the wireless device, the channel information in response to the request.

Another apparatus for wireless communications at a base station is described. The apparatus may include means for receiving, from a wireless device (e.g., a UE), signaling including an indication of a physical configuration for the wireless device, receiving, from the wireless device, a request for channel information corresponding to the identified physical configuration, and transmitting, to the wireless device, the channel information in response to the request.

A non-transitory computer-readable medium storing code for wireless communications at a base station is described. The code may include instructions executable by a processor to receive, from a wireless device (e.g., a UE), signaling including an indication of a physical configuration for the wireless device, receive, from the wireless device, a request for channel information corresponding to the identified physical configuration, and transmit, to the wireless device, the channel information in response to the request.

In some examples of the method, apparatuses, and non-transitory computer-readable medium described herein, transmitting the channel information further may include operations, features, means, or instructions for transmitting, to the wireless device, a set of contiguous CSI-RS resources, where the CSI-RS resources may be determined based on the indication of the physical configuration.

Some examples of the method, apparatuses, and non-transitory computer-readable medium described herein may further include operations, features, means, or instructions for transmitting the set of contiguous CSI-RS resources on a beam that may be specific to the physical configuration to the wireless device.

In some examples of the method, apparatuses, and non-transitory computer-readable medium described herein, the indication of the physical configuration includes an explicit or an implicit indication of the physical configuration relative to past physical configurations of the wireless device.

In some examples of the method, apparatuses, and non-transitory computer-readable medium described herein, the indication of the physical configuration includes an indication of antenna shapes, antenna subarrays, antenna dimensions, or a combination thereof for the physical configuration of the wireless device.

In some examples of the method, apparatuses, and non-transitory computer-readable medium described herein, the indication of the physical configuration includes a quantized indication with a finite size.

In some examples of the method, apparatuses, and non-transitory computer-readable medium described herein, the indication of the physical configuration includes information for a set of applications at a firmware layer, hardware layer, software layer, application layer, or a combination thereof for the wireless device.

In some examples of the method, apparatuses, and non-transitory computer-readable medium described herein, the physical configuration includes a set of antenna elements that forms an antenna array pattern that corresponds to the identified physical configuration.

In some examples of the method, apparatuses, and non-transitory computer-readable medium described herein, the channel information may be associated with beamformed communications with the wireless device.

In some examples of the method, apparatuses, and non-transitory computer-readable medium described herein, the physical configuration includes a foldable state of the wireless device corresponding to different possible foldings of a flexible display unit.

DETAILED DESCRIPTION

Figure 1:
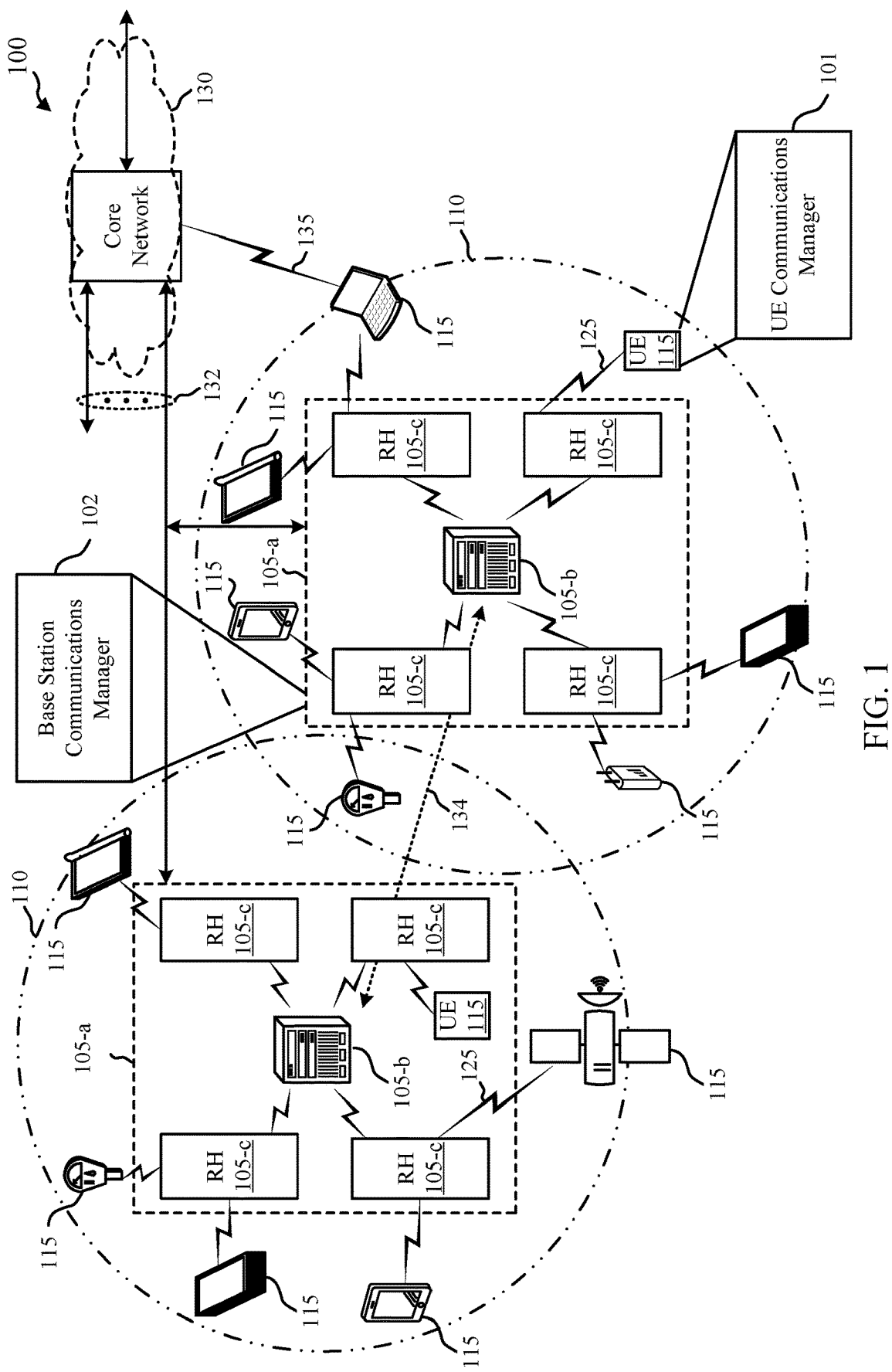
FIG. 1 illustrates an example of a system for wireless communications that supports beamforming codebook adaptation for flexible wireless devices in accordance with aspects of the present disclosure.

A wireless device such as a UE may include multiple antenna modules each with multiple antenna arrays used to support communications between the UE and other wireless devices (e.g., a base station). The multiple antenna arrays may each include a set of antenna elements, each of which may be separately or jointly configured to transmit or receive wireless signals. The multiple antenna arrays may be located or positioned at different parts or along different portions of the UE and may allow the UE to flexibly perform beamforming communications.

When performing communications, the multiple antenna arrays may be configured individually or jointly as antenna sets or groups, and the size of each antenna set or group (including the number of antenna arrays in the antenna set or group) may vary based on a physical configuration of the UE. Recently, UEs with foldable or flexible displays have increased in popularity. For example, a UE may include a flexible (e.g., foldable) display having different physical configurations (e.g., multiple independent foldable display units, flexible displays, bendable displays, rollable displays, additional unique form factors, etc.), and the communication parameters used for transmission and reception of signals via the multiple antenna arrays (or a portion of the multiple antenna arrays) may depend on the physical configuration of the flexible display. In some aspects, a state of the physical configuration of the flexible display (e.g., a closed state, a partially open state, a fully open state, etc.) or the arrangement of the multiple antenna arrays relative to one another may be used to configure and perform beamforming communications between the UE and a base station.

While form factor and cost considerations result in most UEs having a non-foldable display, UEs with foldable displays have gained increasing traction as design complexity has decreased. UEs with foldable displays may present new challenges in wireless communications. For example, depending on a configuration of the foldable displays of a UE, traditional techniques may be unsuitable or may need to be enhanced for improving beamforming communications between the UE and other wireless devices (e.g., a base station). For existing systems and UEs, antenna arrays (e.g., shapes and sizes) may be known and fixed (e.g., linear arrays, planar arrays, etc.). As such, analog beamforming codebooks may be generated beforehand and stored in local memory (e.g., RFIC memory) of the UEs. These analog beamforming codebooks may be used to enable beamforming communications between the UEs and other wireless devices (e.g., other UEs, base stations, etc.). For example, the analog beamforming codebooks may enable the UEs to determine characteristics about the beams (e.g., beamwidth, size, direction, gain in a certain direction, etc.) prior to transmitting information and messages on the beams.

Currently, a link budget (e.g., an amount of received power based on a transmitted power and considering any gains and losses during transmission) may be met for flexible UEs through different beamforming techniques. For example, multi-antenna analog beamforming with directional codebooks of beams may be used to increase antenna array gains for the link budget. Such codebooks may be designed prior to the communications (e.g., a priori) according to different design criteria of the flexible UEs and stored in the flexible UEs (e.g., in local memory). However, all of the codebooks that correspond to the different foldable states may not be calculated beforehand (e.g., since the codebooks depend on a specific device use or form factor which may change in time). Additionally, the flexible UEs may have limited local memory storage such that not all of the analog beamforming codebooks corresponding to all possible different foldable states of the flexible UE can be stored for use at all times.

As described herein, a flexible UE may perform a codebook adaptation based on an identified foldable state for itself. For example, if the flexible UE determines that a current or upcoming foldable state does not correspond to a codebook that has been determined prior to the foldable state and is not stored in the local memory (e.g., pre-loaded), the flexible UE may provide information about the folding state to a base station and an indication that a codebook is currently undetermined or unavailable for the foldable state. Additionally, when providing this information to the base station, the flexible UE may also request that the base station provide channel information to assist with the codebook determination. In some cases, this request may indicate to the base station to allocate a specific number of contiguous CSI-RS symbols that the UE can use for the codebook determination. Additionally or alternatively, the UE may generate the codebook internally and then signal to the base station a request for a beam refinement procedure with the generated codebook. This beam refinement procedure request may also indicate to the base station to transmit a set of contiguous CSI-RS symbols to determine beams for subsequent communication.

Aspects of the disclosure are initially described in the context of a wireless communications system. Examples of additional wireless communications systems, flexible wireless devices, and a process flow are then provided to illustrate aspects of the disclosure. Aspects of the disclosure are further illustrated by and described with reference to apparatus diagrams, system diagrams, and flowcharts that relate to beamforming codebook adaptation for flexible wireless devices.

FIG. 1 illustrates an example of a wireless communications system 100 that supports beamforming codebook adaptation for flexible wireless devices in accordance with aspects of the present disclosure. The wireless communications system 100 includes network devices 105, UEs 115, and a core network 130. In some examples, the wireless communications system 100 may be an LTE network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices 105 (e.g., network device 105-a), which may be an example of a base station (e.g., eNB, network access devices, gNB), or network device 105-b, which may be an example of an access node controller (ANC)), may interface with the core network 130 through backhaul links 132 (e.g., S1, S2) and may perform radio configuration and scheduling for communication with the UEs 115. In various examples, the network devices 105-b may communicate, either directly or indirectly (e.g., through core network 130), with each other over backhaul links 134 (e.g., X1, X2), which may be wired or wireless communication links.

Each network device 105-b may also additionally or alternatively communicate with a number of UEs 115 through a number of other network devices 105-c, where network device 105-c may be an example of a smart radio head (or through a number of smart radio heads). In alternative configurations, various functions of each network device 105 may be distributed across various network devices 105 (e.g., radio heads and access network controllers) or consolidated into a single network device 105 (e.g., a base station).

Network device 105 may wirelessly communicate with UEs 115 via one or more base station antennas. Network device 105 described herein may include or may be referred to by those skilled in the art as a base transceiver station, a radio base station, an access point, a radio transceiver, a NodeB, an eNodeB (eNB), a 5G or a next-generation NodeB or giga-NodeB (either of which may be referred to as a gNB), a Home NodeB, a Home eNodeB, or some other suitable terminology. Wireless communications system 100 may include network devices 105 of different types (e.g., macro or small cell base stations). The UEs 115 described herein may be able to communicate with various types of network devices 105 and network equipment including macro eNBs, small cell eNBs, gNBs, relay base stations, and the like.

Each network device 105 may be associated with a particular geographic coverage area 110 in which communications with various UEs 115 is supported. Each network device 105 may provide communication coverage for a respective geographic coverage area 110 via communication links 125, and communication links 125 between a network device 105 and a UE 115 may utilize one or more carriers. Communication links 125 shown in wireless communications system 100 may include uplink transmissions from a UE 115 to a network device 105, or downlink transmissions from a network device 105 to a UE 115. Downlink transmissions may also be called forward link transmissions while uplink transmissions may also be called reverse link transmissions.

The geographic coverage area 110 for a network device 105 may be divided into sectors making up only a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 or by different network devices 105. The wireless communications system 100 may include, for example, a heterogeneous LTE/LTE-A/LTE-A Pro or NR network in which different types of network devices 105 provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. Additionally, as described herein, a UE 115 may be a flexible wireless device with a foldable display. For example, a UE 115 may have multiple independent foldable display units, flexible displays, bendable displays, rollable displays, or other unique form factors. As used herein, the descriptors "foldable display", "flexible display", "bendable display", and "rollable display" may be used interchangeably, where each of the descriptors relates to a UE 115 that includes one or more antenna arrays that can change based on an adjustable physical configuration of the UE 115. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. A UE 115 may communicate with the core network 130 through communication link 135.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

Network devices 105 may communicate with the core network 130 and with one another. For example, network devices 105 may interface with the core network 130 through backhaul links 132 (e.g., via an S1, N2, N3, or other interface). Network devices 105 may communicate with one another over backhaul links 134 (e.g., via an X2, Xn, or other interface) either directly (e.g., directly between network devices 105) or indirectly (e.g., via core network 130).

The core network 130 may provide user authentication, access authorization, tracking, IP connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a network device 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (which may be known as a TRP; however, in the present disclosure, TRP will be assumed to stand for total radiated power unless otherwise specified). In some configurations, various functions of each access network entity or network device 105 may be distributed across various network devices (e.g., radio heads and access network controllers) or consolidated into a single network device (e.g., a network device 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and network devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as network devices 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a network device 105) and a receiving device (e.g., a UE 115), where the transmitting device is equipped with multiple antennas and the receiving devices are equipped with one or more antennas.

MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a network device 105 may use multiple antennas or antenna arrays to conduct beamforming operations for directional communications with a UE 115. For instance, some signals (e.g., synchronization signals, reference signals, beam selection signals, or other control signals) may be transmitted by a network device 105 multiple times in different directions, which may include a signal being transmitted according to different beamforming weight sets associated with different directions of transmission. Transmissions in different beam directions may be used to identify (e.g., by the network device 105 or a receiving device, such as a UE 115) a beam direction for subsequent transmission or reception by the network device 105.

Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the network device 105 in different directions, and the UE 115 may report to the network device 105 an indication of the signal it received with a highest signal quality, or an otherwise acceptable signal quality. Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the network device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a network device 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105 or core network 130 supporting radio bearers for user plane data. At the Physical layer, transport channels may be mapped to physical channels.

In some cases, UEs 115 and network devices 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers (CCs) using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a network device 105.

The term "carrier" refers to a set of radio frequency spectrum resources having a defined physical layer structure for supporting communications over a communication link

125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., network devices 105 or UEs 115) may have a hardware configuration that supports communications over a particular carrier bandwidth, or may be configurable to support communications over one of a set of carrier bandwidths. In some examples, the wireless communications system 100 may include network devices 105 or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or network device 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may have multiple antenna arrays for wireless communication between the UE 115 and other wireless devices (e.g., a network device 105). Additionally, the UE 115 may include a flexible display with multiple foldable states (e.g., different physical configurations). For example, the multiple foldable states may include flexible, bendable, or rollable displays that can result in the UE 115 being used for different functions (e.g., a mobile device, a phone, a tablet, or other devices with different form factors). These flexible UEs 115 may be utilized in wireless communications system 100 (e.g., 5G or NR system), where performance is maintained for different types of communications on different frequencies. For example, beamforming techniques may be used for communications between the flexible UEs 115 and network devices 105 in a mmW regime/frequency range (e.g., greater than 24 GHz).

Currently, a link budget (e.g., an amount of received power based on a transmitted power and considering any gains and losses during transmission) may be met in wireless communications system 100 for the flexible UEs 115 through different beamforming techniques. For example, multi-antenna beamforming with directional codebooks of beams may be used to increase antenna array gains for the link budget. Such codebooks may be designed prior to the communications (e.g., a priori) according to different design criteria of the flexible UEs 115 and stored in a local memory of the flexible UEs 115 (e.g., RFIC memory). In some cases, the codebooks may be used by the flexible UEs 115 to determine different beam weights to apply to different antenna arrays in the flexible UEs 115 for creating one or more beams in a particular direction, a size of the one or more beams (e.g., beamwidth), or additional parameters of the one or more beams.

Additionally, different foldable states of the flexible UEs 115 (e.g., mobile/tablet/intermediate state, rolled up, etc.) may lead to different antenna subarrays that can be used for the communications (e.g., useful subarrays with different shapes and antenna dimensions). Accordingly, since the antenna subarrays available for communications can change, different hierarchical analog beamforming codebooks (e.g., wider or narrower beams) may be needed based on a current foldable state or upcoming (e.g., emerging) foldable state of the flexible UEs 115 (e.g., at different points in time). However, all of the analog beamforming codebooks that correspond to the different foldable states of the flexible UEs 115 may not be calculated beforehand (e.g., since the codebooks depend on a specific device use or form factor). Additionally, the flexible UEs 115 may have limited local storage such that not all of the analog beamforming codebooks can be stored for use at all times.

Wireless communications system 100 may support efficient techniques for performing codebook adaptation for flexible UEs 115. For example, if a flexible UE 115 determines that a current or upcoming foldable state does not correspond to a codebook that has been determined prior to the foldable state and is not stored in the local memory (e.g., pre-loaded), the flexible UE 115 may provide information about the folding state to a base station 105 and an indication that a codebook is currently undetermined or unavailable for the folding state. Additionally, when providing this information to the base station 105, the flexible UE 115 may also request that the base station 105 provide channel information to assist with the codebook determination. In some cases, this request may indicate for the base station 105 to allocate a specific number of CSI-RS symbols that the UE can use for codebook determination. Additionally or alternatively, the UE 115 may generate the codebook internally and then signal to the base station 105 a request for a beam refinement procedure with the generated codebook. This beam refinement procedure request may also indicate to for the base station 105 to transmit a set of CSI-RS symbols to determine beam weights for subsequent communication.

UEs 115 (e.g., wireless devices) may include a UE communications manager 101 for enabling a codebook determination for beamformed communications with a network device 105 (e.g., base station 105). The UE communications manager 101 may enable a UE 115 to identify a physical configuration (e.g., foldable state) of itself and determine if an analog beamforming codebook that corresponds to the identified physical configuration is currently pre-loaded in its memory. If the UE 115 determines that a corresponding analog beamforming codebook is not pre-loaded in its memory, the UE communications manager 101 may enable the UE 115 to transmit signaling to the network device 105 that includes an indication of the physical configuration of the UE 115 and a request for channel information for a subsequent communication with the base station. The UE communications manager 101 may then enable the UE 115 to receive this channel information from the network device 105 based on the request and determine an analog beamforming codebook for the subsequent communication. In some cases, the channel information may include a set of contiguous CSI-RS resources that the UE 115 uses to determine the analog beamforming codebook. Additionally or alternatively, the UE communications manager 101 may enable the UE 115 to generate the analog beamforming codebook internally and then to signal to the network device 105 a request for a beam refinement procedure (e.g., channel information) with the generated codebook, where the request indicates for the base station 105 to transmit a contiguous set of CSI-RS symbols to determine beams for the subsequent communication.

One or more of the network devices 105 (e.g., base stations 105) may include a base station communications manager 102, which may enable a network device 105 to receive signaling from a UE 115 that includes an identified physical configuration of the UE 115 and a request for channel information from the UE 115 that corresponds to the identified physical configuration of the UE 115. The base station communications manager 102 may then enable the network device 105 to transmit the requested channel information to the UE 115. In some cases, the transmitted channel information may include a set of contiguous CSI-RS resources that are determined based on the identified physical configuration of the UE 115. Additionally, the base station communications manager 102 may enable the network device 105 to transmit the set of contiguous CSI-RS resources on a beam specific to the identified physical configuration.

Figure 2:
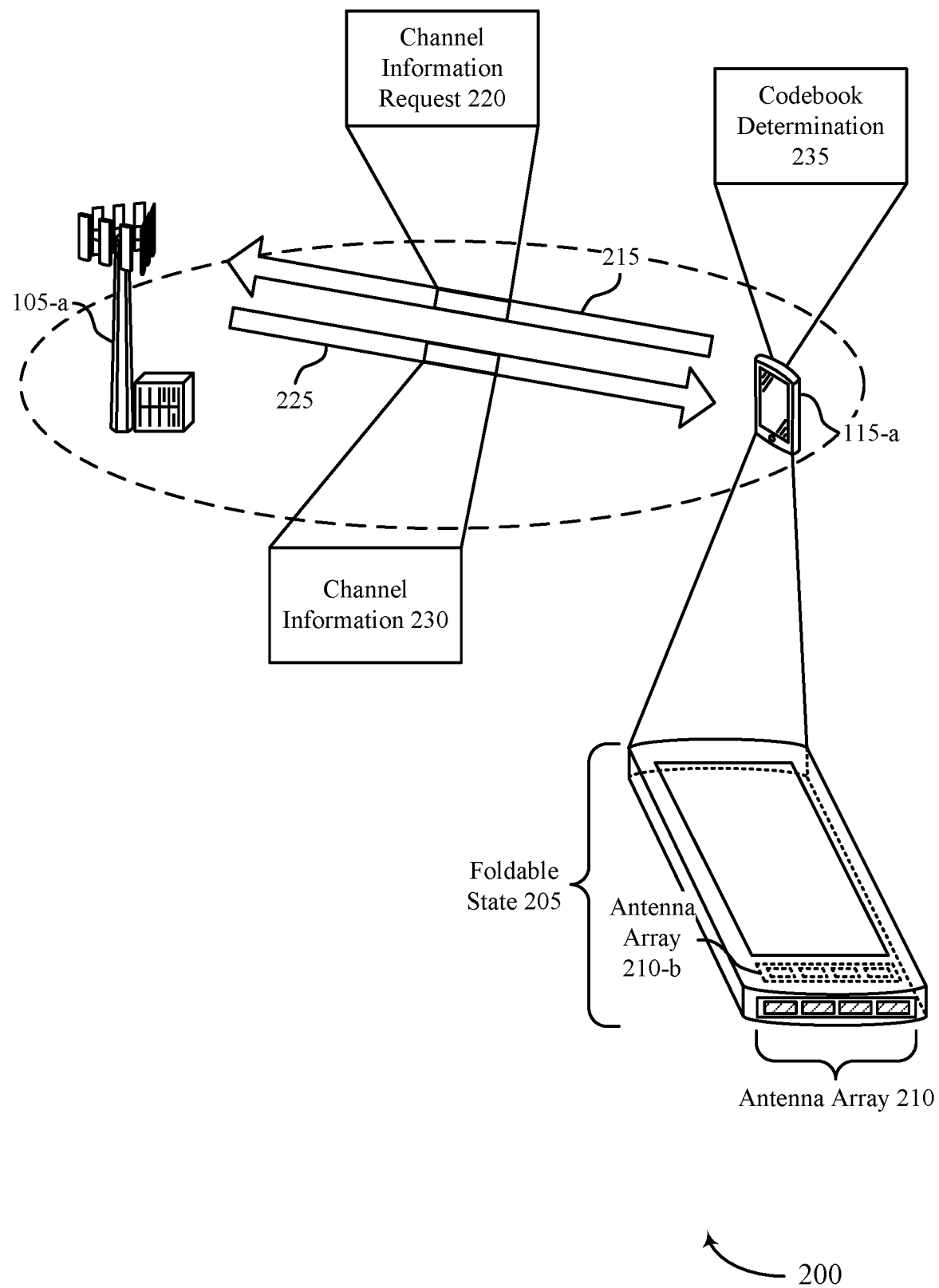
FIGS. 2 and 3 illustrate examples of wireless communications systems that support beamforming codebook adaptation for flexible wireless devices in accordance with aspects of the present disclosure.

FIG. 2 illustrates an example of a wireless communications system 200 that supports beamforming codebook adaptation for flexible wireless devices in accordance with aspects of the present disclosure. In some examples, wireless communications system 200 may implement aspects of wireless communications system 100. Wireless communications system 200 may include a base station 105-a and a UE 115-a, which may be examples of corresponding network devices 105 and UEs 115, respectively, as described above with reference to FIG. 1. As described herein, UE 115-a may be referred to as a flexible UE 115, where UE 115-a includes different flexible displays and foldable states (e.g., physical configurations). For example, the different foldable states may include flexible, bendable, or rollable displays that UE 115-a uses for different functions (e.g., a mobile device, a phone, a tablet, or other devices with different form factors). Accordingly, UE 115-a may need to determine an analog beamforming codebook to communicate with base station 105-a based on the different foldable states.

For existing systems and UEs 115, antenna arrays (e.g., shapes and sizes) may be known and fixed (e.g., linear arrays, planar arrays, etc.). As such, analog beamforming codebooks may be generated beforehand and stored in local memory (e.g., RFIC memory) of the UEs 115. These analog beamforming codebooks may be used to enable beamforming communications between the UEs 115 and other wireless devices (e.g., other UEs 115, base stations 105, etc.). For example, the analog beamforming codebooks may enable the UEs 115 to determine characteristics about the beams (e.g., beamwidth, size, direction, gain in a certain direction, etc.) prior to transmitting information and messages on the beams. Additionally, the analog beamforming codebooks may be determined and used based on a number of available radio frequency chains available for communications. The number of available radio frequency chains may be less than a number of antenna elements on the UE 115.

However, given the continuum of possible folding states (e.g., foldable states or physical configurations) and the complexity and flexibility associated with the different display types of the UEs 115, it may not be possible or feasible for the UEs 115 to design all of the possible analog beamforming codebooks for the different antenna array configurations (e.g., foldable states) beforehand or store all of the possible analog beamforming codebooks in the local memory (e.g., based on limited storage for codebooks). For example, the antenna shapes and dimensions can change with a large number of possibilities upon use in a flexible system such that corresponding analog beamforming codebooks for the large number of possibilities cannot be determined prior to associated communications or the foldable states are observed. Thus, UE 115-*a* and base station 105-*a* may support a codebook adaptation procedure to determine an analog beamforming codebook for UE 115-*a* based on a foldable state 205 of UE 115-*a*, where the foldable state 205 includes a configuration of an antenna array 210.

The antenna array 210 may be located in different positions around UE 115-*a*. For example, antenna array 210-*a* may illustrate an example of an antenna array position at the bottom of UE 115-*a*. Additionally or alternatively, antenna array 210-*b* may illustrate an example of an antenna array placement on the backside of UE 115-*a*. The different placements of the antenna array 210 may depend on a form factor of UE 115-*a*, design constraints with UE 115-*a*, performance enhancements for UE 115-*a* (e.g., to minimize external interference by a user's hand), or other factors. While these two placements are shown in the example of FIG. 2, it is to be understood that the antenna array 210 may be placed at additional different positions around UE 115-*a* (e.g., front face, sides, etc.) or include multiple antenna arrays located at multiple positions around UE 115-*a*.

UE 115-*a* may use one or more sensors (e.g., potentiometer, gyros, etc.) to assist with discovering its foldable state 205 (e.g., a folding position/state). For example, a potentiometer may measure an effective resistance between a beginning and an end of an antenna array and determine a number of antennas in the antenna array based on the effective resistance. In some cases, foldable state 205 may include an intermediate state of folding, rolling, or bending of UE 115-*a* and/or indicate a state of "wearableness" of UE 115-*a* (e.g., where UE 115-*a* can be worn as a watch as an example). Additionally, foldable state 205 may be identified relative to one (or many) default foldable states of UE 115-*a*. The memory of UE 115-*a* may be pre-loaded with analog beamforming codebooks for one or more default folding positions along with the foldable state corresponding to the analog beamforming codebook.

In some cases, UE 115-*a* may determine whether its foldable state 205 corresponds to any of the pre-loaded analog beamforming codebooks. If UE 115-*a* is in a new or emerging state of folding for which there is no analog beamforming codebook stored or detectable in its memory, UE 115-*a* may send an uplink transmission 215 to base station 105-*a* that includes a channel information request 220. For example, UE 115-*a* may request assistance from base station 105-*a* in a codebook design or determination. When transmitting channel information request 220, UE 115-*a* may also provide configuration information to base station 105-*a* about its foldable state 205 and the lack of an analog beamforming codebook for foldable state 205. In some cases, UE 115-*a* may also determine whether its foldable state 205 is the same as a previous foldable state and/or how it compares to previous foldable states reported to base station 105-*a*.

This configuration information may include a description of foldable state 205 relative to past folding states (e.g., an implicit description relative to the past states) or may include an explicit or more active description of foldable state 205 (e.g., an indication of the specific antenna array shape and size for foldable state 205, as well as the directions over which the antenna array can be used). Accordingly, foldable state 205 may be translated into antenna information that base station 105-*a* can use for processing, where the antenna information may indicate the antenna shape (e.g., linear, planar, circular, collocated, distributed, etc.) and the antenna dimensions of antenna array 210. Additionally or alternatively, the configuration information may be described in a quantized form with a limited number of bits. This configuration information may also be used across multiple applications at a firmware, hardware, software, and applications levels for UE 115-*a*.

Additionally, channel information request 220 may include a request from UE 115-*a* to base station 105-*a* to offer a contiguous series of CSI-RS symbols to assist with a codebook determination for the analog beamforming codebook. Conventionally, CSI-RS symbols may be used for beam refinement procedures, determining beam weights to be used in communication, determining timings, frequency offsets, and phase noise corrections for the communication, etc. However, the CSI-RS symbols may also be used to for the analog beamforming codebook determination. Accordingly, UE 115-*a* may indicate that the requested CSI-RS symbols are needed for the analog beamforming codebook determination. For example, UE 115-*a* may indicate this use for the CSI-RS symbols via a one (1) bit indication in channel information request 220.

Base station 105-*a* may then send a downlink transmission 225 to UE 115-*a* that includes channel information 230 to enable UE 115-*a* to perform a codebook determination 235 for the analog beamforming codebook. For example, channel information 230 may use the configuration information on foldable state 205 received as part of channel information request 220 to allocate a number of CSI-RS symbols specific to foldable state 205 for UE 115-*a* to perform codebook determination 235. Over these CSI-RS symbols, base station 105-*a* may use a beam that is specific to foldable state 205 for transmitting channel information 230. This specific beam may allow UE 115-*a* to use a set of sampling beams over the contiguous series of CSI-RS symbols for codebook determination 235. In some cases, the produced analog beamforming codebook from codebook determination 235 may be different than the sampling beams used to receive channel information 230. In such cases, the symbol estimates made with the sampling beams can be used to estimate a better set of beam weights for co-phasing.

After determining the analog beamforming codebook for foldable state 205 based on channel information 230 received from base station 105-*a*, UE 115-*a* may use the analog beamforming codebook until foldable state 205 changes. As described, this codebook adaptation procedure may be performed prior to proceeding to a beam refinement procedure. Additionally or alternatively, UE 115-*a* may internally generate and adapt an analog beamforming codebook and then perform a beam refinement procedure with the generated analog beamforming codebook.

Figure 3:
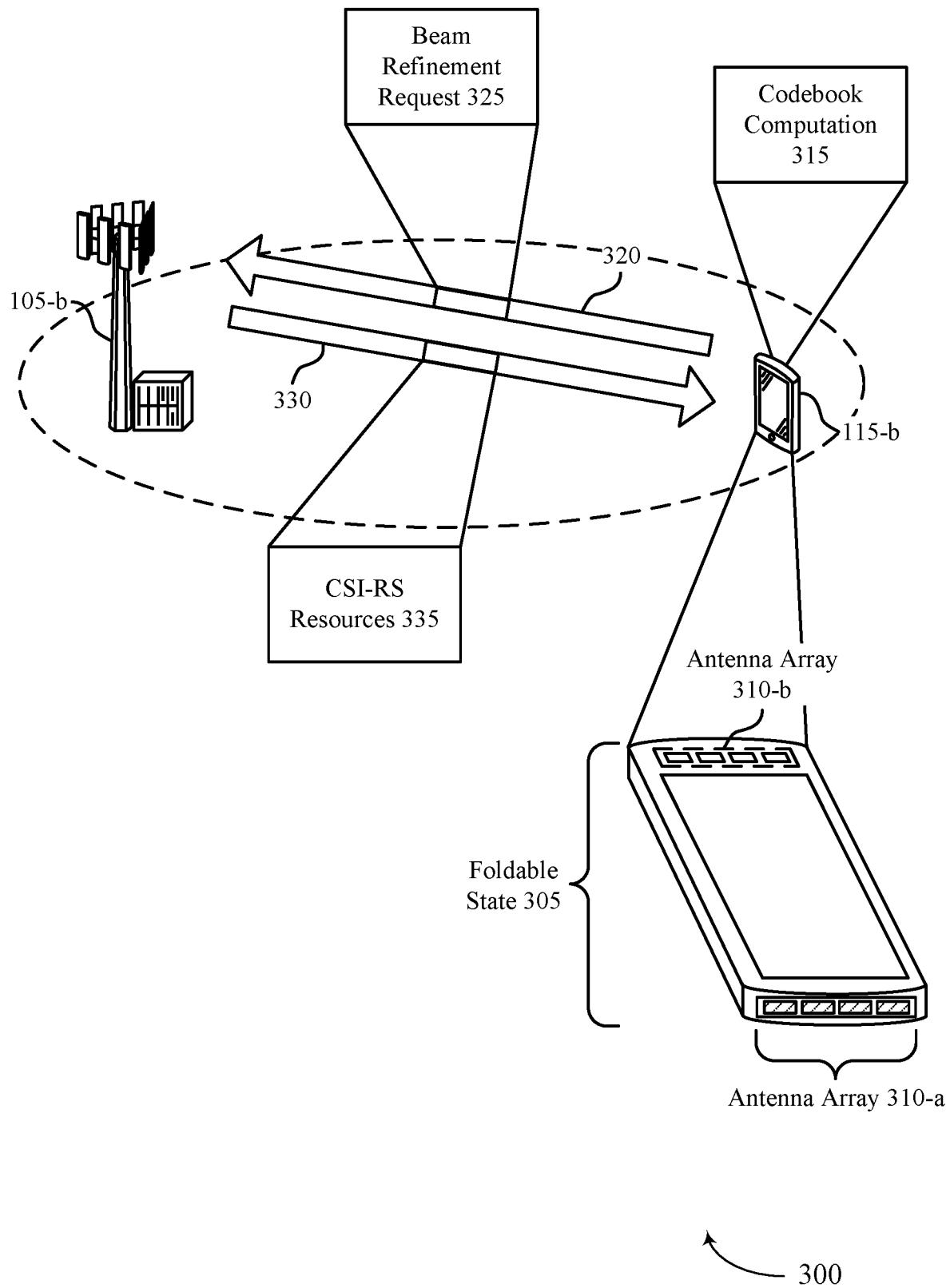

FIG. 3 illustrates an example of a wireless communications system 300 that supports beamforming codebook adaptation for flexible wireless devices in accordance with aspects of the present disclosure. In some examples, wireless communications system 300 may implement aspects of wireless communications systems 100 and/or 200. Wireless communications system 300 may include a base station 105-*b* and a UE 115-*b*, which may be examples of corresponding devices as described above with reference to FIGS. 1 and 2. As described herein, UE 115-*b* may be referred to as a flexible UE 115, where UE 115-*a* includes different flexible displays and foldable states (e.g., physical configurations). For example, the different foldable states may include flexible, bendable, or rollable displays that UE 115-*b* uses for different functions (e.g., a mobile device, a phone, a tablet, or other devices with different form factors). Accordingly, UE 115-*b* may need to determine an analog beamforming codebook to communicate with base station 105-*b* based on the different foldable states.

As described above with reference to FIG. 2, UE 115-*b* may identify a foldable state 305 for itself that includes an antenna array 310, where foldable state 305 does not correspond to any pre-loaded analog beamforming codebooks in the memory of UE 115-*b*. The antenna array 310 may be located in different positions around UE 115-*b*. For example, antenna array 310-*a* may illustrate an example of an antenna array position at the bottom of UE 115-*b*. Additionally or alternatively, antenna array 310-*b* may illustrate an example of an antenna array placement on the front side of UE 115-*b*. The different placements of the antenna array 310 may depend on a form factor of UE 115-*b*, design constraints with UE 115-*b*, performance enhancements for UE 115-*b* (e.g., to minimize external interference by a user's hand), or other factors. While these two placements are shown in the example of FIG. 3, it is to be understood that the antenna array 310 may be placed at additional different positions around UE 115-*b* (e.g., front face, sides, etc.) or include multiple antenna arrays located at multiple positions around UE 115-*b*.

In addition or alternative to the codebook adaptation process described above with reference to FIG. 2, UE 115-*b* may feed information about foldable state 305 from sensors (e.g., potentiometers, gyros, etc.) to a central processor of UE 115-*b* for an offline codebook design and determination. Accordingly, the central processor may perform a codebook computation 315 to generate an analog beamforming codebook for foldable state 305 based on the sensor information. The central processor may then feed the generated analog beamforming codebook to a modem (e.g., and at least one RFIC associated with the modem) for a subsequent communication with base station 105-*b*.

In some cases, UE 115-*b* may use the generated analog beamforming codebook to send an uplink transmission 320 to base station 105-*b* that includes a beam refinement request 325. Beam refinement request 325 may include a request for a new set of CSI-RS symbols to use for a beam determination. This set of CSI-RS symbols may be different than the set of contiguous CSI-RS symbols used for determining the analog beamforming codebook as described above with reference to FIG. 2. In some cases, the set of CSI-RS symbols may be determined (e.g., which symbols, a number of symbols, etc.) based on characteristics of UE 115-*b* (e.g., location, type of UE 115, foldable state 305, etc.). Based on beam refinement request 325, base station 105-*b* may send a downlink transmission 330 that includes one or more CSI-RS resources 335 as indicated in the request. UE 115-*b* may then perform a beam refinement procedure based on the received CSI-RS resources 335 (e.g., to determine refined or narrower beams for subsequent communications with base station 105-*b*).

Figure 4:
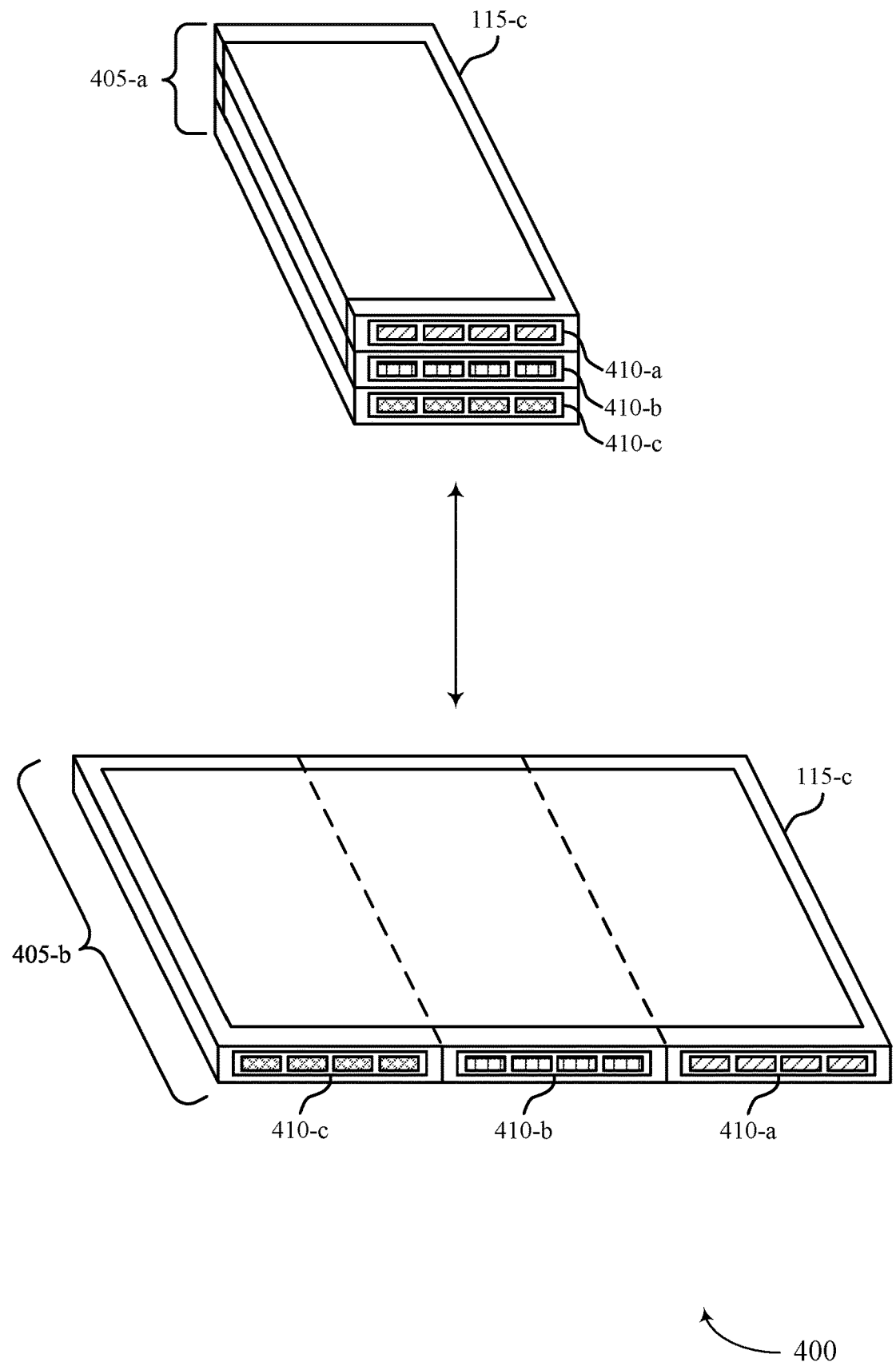
FIGS. 4, 5, and 6 illustrate examples of different flexible wireless devices that support beamforming codebook adaptations in accordance with aspects of the present disclosure.

FIG. 4 illustrates an example of a flexible wireless device 400 that supports beamforming codebook adaptation in accordance with aspects of the present disclosure. In some examples, flexible wireless device 400 may implement aspects of wireless communications systems 100, 200, and/or 300. Flexible wireless device 400 may be a UE 115-*c*, which may be an example of a UE 115 as described above with reference to FIGS. 1-3. In particular, UE 115-*c* may illustrate a tri-folding example of a flexible UE 115.

As shown, UE 115-*c* may include a mobile form factor with foldable state 405-*a*. With foldable state 405-*a*, three antenna arrays 410 may be formed into a planar array with collocated antennas. For example, a first antenna array 410-*a* may be located on a first fold, a second antenna array 410-*b* may be located on a second fold, and a third antenna array 410-*c* on a third fold of UE 115-*c*. Based on the antenna arrays 410 being collocated, an overall antenna planar array of four (4) antenna elements by three (3) antenna elements may be configured. Additionally, UE 115-*c* may include a tablet form factor that corresponds to foldable state 405-*b*, where the three antenna arrays 410 are changed to a distributed array of three linear antenna arrays of four (4) antennas by one (1) antenna. Accordingly, with the example of tri-folding, UE 115-*c* may change both an effective array shape and size of antennas based on the foldable state 405 (e.g., planar and collocated for foldable state 405-*b* to linear and distributed for foldable state 405-*a*). In some cases, UE 115-*c* may assume that the antenna elements are placed in foldable state 405-*b* as a default, and the antenna element are transformed to the placement for foldable state 405-*a*.

Based on the configuration of antenna arrays 410, an analog beamforming codebook determination may differ. For example, a planar array of antenna elements as shown for foldable state 405-*a* may correspond to a first analog beamforming codebook, while a distributed linear array of antenna elements may correspond to a second analog beamforming codebook for foldable state 405-*b*. As such, the second analog beamforming codebook for foldable state 405-*b* may be pre-loaded into a memory of UE 115-*c* (e.g., if foldable state 405-*b* is a default state), while the first analog beamforming codebook for foldable state 405-*a* is not pre-loaded into the memory. UE 115-*c* may then perform a codebook adaptation procedure as described above with reference to FIGS. 2 and/or 3 to determine the first analog beamforming codebook when in foldable state 405-*a* or just prior to using foldable state 405-*a* (e.g., an emerging folding state). Additionally or alternatively, while not shown, UE 115-*c* may use an intermediate foldable state between foldable state 405-*a* and 405-*b*, where two folds are stacked, and one fold is adjacent to the stack. As such, if a corresponding analog beamforming codebook is not pre-loaded in UE 115-*c* for this intermediate foldable state, UE 115-*c* may perform a codebook adaptation procedure as described herein to determine the corresponding analog beamforming codebook.

Figure 5:
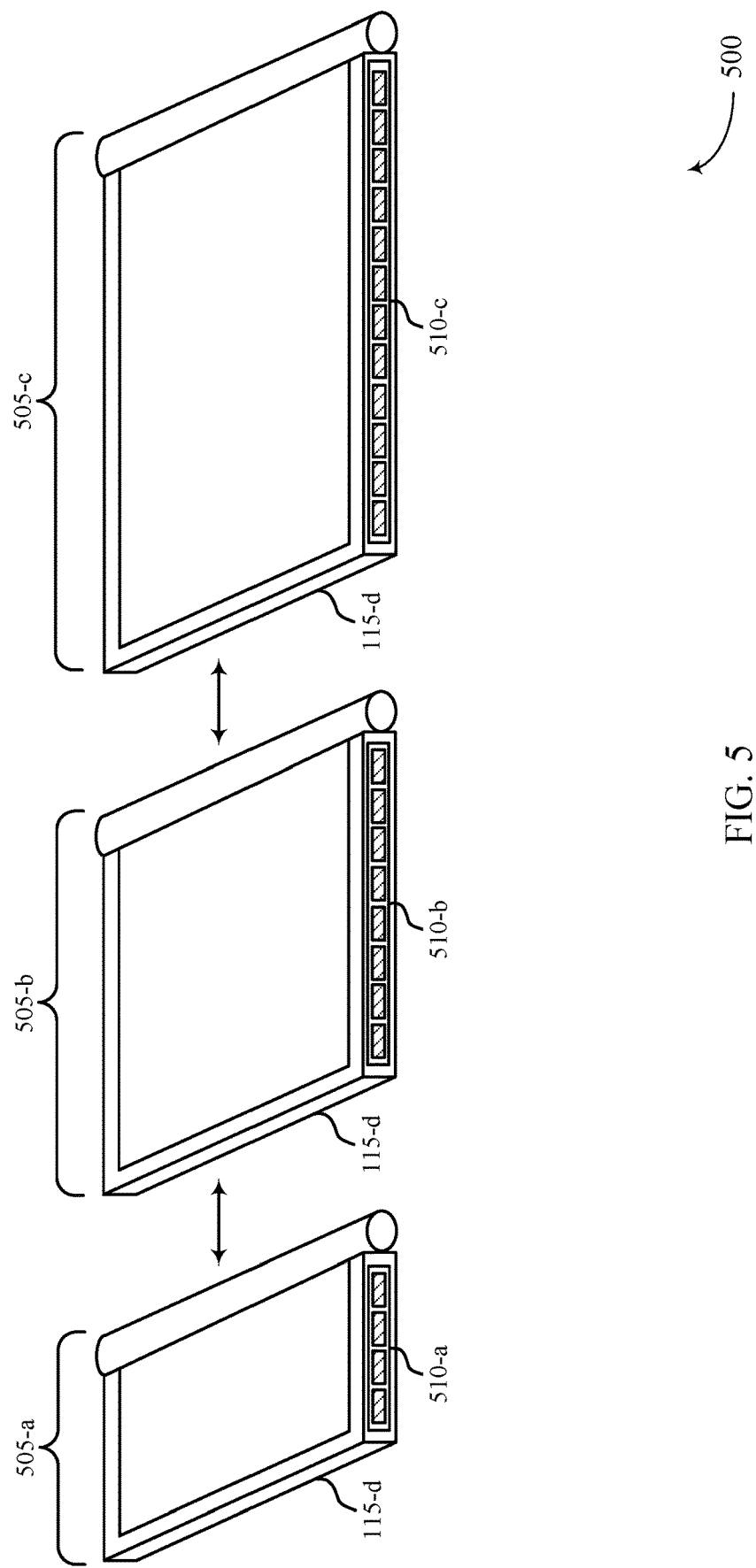

FIG. 5 illustrates an example of a flexible wireless device 500 that supports beamforming codebook adaptation for flexible wireless devices in accordance with aspects of the present disclosure. In some examples, flexible wireless device 500 may implement aspects of wireless communications systems 100, 200, and/or 300. Flexible wireless device 500 may be a UE 115-d, which may be an example of a UE 115 as described above with reference to FIGS. 1-3. In particular, UE 115-d may illustrate a rolling example of a flexible UE 115.

UE 115-d may include multiple foldable states 505 that correspond to different form factors and a number of active mode antenna elements on an antenna array 510 based on the foldable state 505. As the foldable state 505 and corresponding form factor is reduced, the antenna elements may overlap from a previous foldable state 505 and recline into or behind existing antenna elements for the current foldable state 505. Based on the overlapping antenna elements, the antenna elements that recline into or behind the existing antenna elements may enter an inactive mode. For example, UE 115-d may be internally configured to deactivate an antenna element when it goes behind another antenna element.

Initially, UE 115-d may assume that its antenna elements are placed according to an antenna array 510-c for a corresponding foldable state 505-c, where foldable state 505-c is a tablet form factor of UE 115-d. For example, antenna array 510-c may include a linear array of twelve (12) antenna elements by one (1) antenna element. UE 115-d may then roll down to a foldable state 505-b that includes an antenna array 510-b, where foldable state 505-b corresponds to an intermediate state of rolling for UE 115-d. Foldable state 505-b may include a number of antenna elements in antenna array 510-b that is less than the number of antenna elements in antenna array 510-c. For example, antenna array 510-b may include a linear array of eight (8) antenna elements by one (1) antenna element. UE 115-d may further be rolled down to a foldable state 505-a that includes an antenna array 510-a, where foldable state 505-a corresponds to a mobile form factor for UE 115-d. Foldable state 505-a may include a number of antenna elements in antenna array 510-a that is less than the number of antenna elements in both antenna array 510-c and antenna array 510-b. For example, antenna array 510-a may include a linear array of four (4) antenna elements by one (1) antenna element.

Based on this rolling example, an antenna array 510 may remain linear, but the antenna array 510 may change in size and with a corresponding number of active antenna elements based on the state of rolling. Accordingly, the different number of active antenna elements in the antenna array 510 may correspond to different analog beamforming codebooks. If an identified foldable state with a corresponding number of active antenna elements does not correspond to any pre-loaded analog beamforming codebooks in a memory of UE 115-d, UE 115-d may then determine an analog beamforming codebook based on a codebook adaption procedure as described above with reference to FIGS. 2 and/or 3. For example, no analog beamforming codebook may be pre-loaded in UE 115-d for foldable state 505-b, and UE 115-d may determine the corresponding analog beamforming codebook based on information received from a base station 105 or based on an internal codebook calculation and generation at a central processor of UE 115-d.

Figure 6:
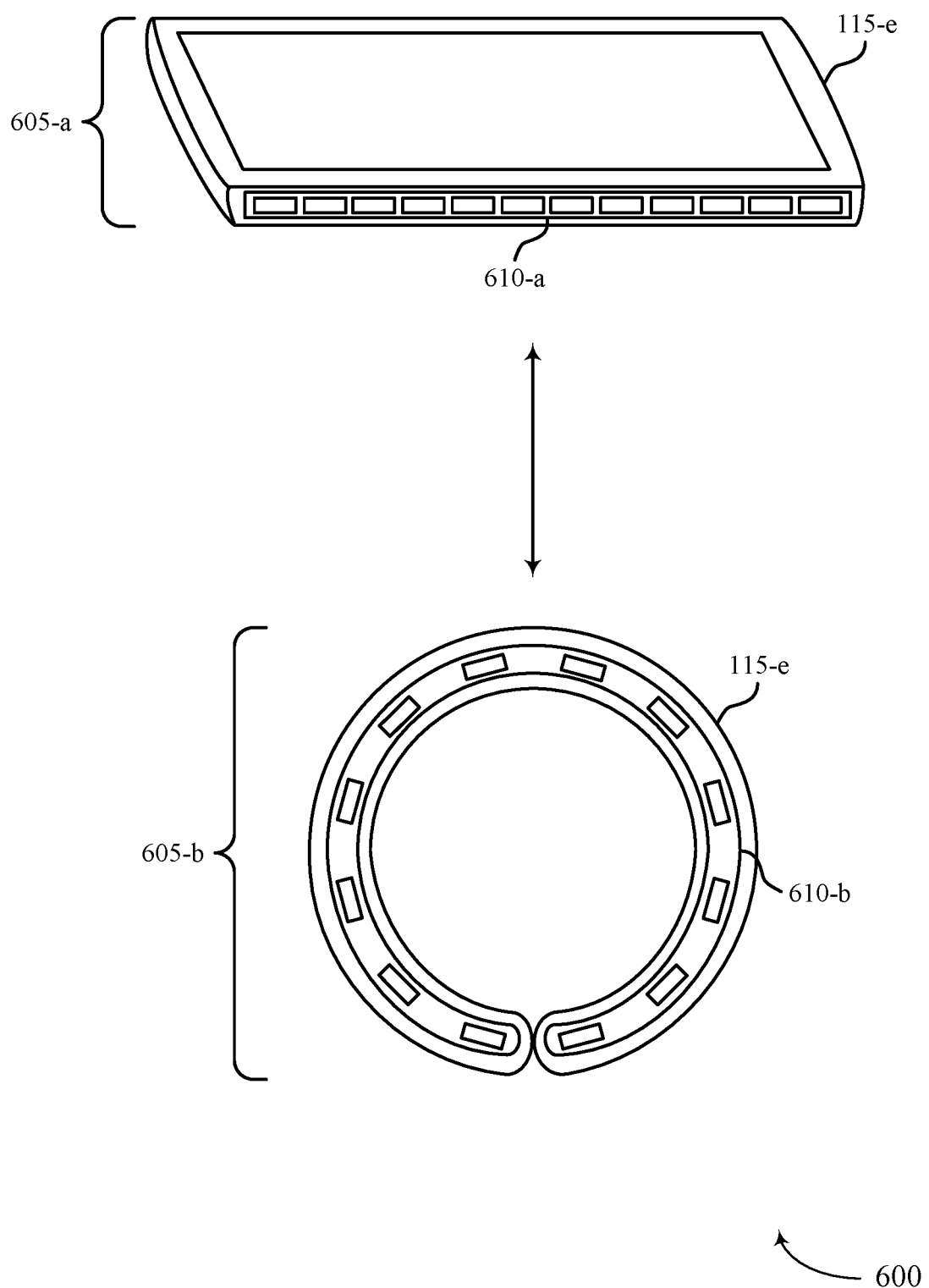

FIG. 6 illustrates an example of a flexible wireless device 600 that supports beamforming codebook adaptation for flexible wireless devices in accordance with aspects of the present disclosure. In some examples, flexible wireless device 600 may implement aspects of wireless communications systems 100, 200, and/or 300. Flexible wireless device 600 may be a UE 115-e, which may be an example of a UE 115 as described above with reference to FIGS. 1-3. In particular, UE 115-e may illustrate a wearable example of a flexible UE 115 (e.g., such as a watch).

UE 115-e may include different foldable states 605 correspond to different form factors and an antenna array 610. For example, UE 115-e may initially assume that antenna elements are placed according to a foldable state 605-a and an antenna array 610-a, where foldable state 605-a is a mobile form factor of UE 115-e. As shown, antenna array 610-a may include a linear array of twelve (12) antenna elements by one (1) antenna element. UE 115-e may then be rolled up to a wearable shape as indicated by a foldable state 605-b. Foldable state 605-b may include the same number of antenna elements in an antenna array 610-b as antenna array 610-a. However, antenna array 610-b may be circular or have a different shape, orientation, etc., compared to antenna array 610-a for foldable state 605-a.

The transformation of a linear array of antenna elements to a circular array of antenna elements may result in a need for separate analog beamforming codebooks for the corresponding antenna array 610 and foldable state 605. For example, antenna array 610-b may result in using beams in two dimensions as opposed to antenna array 610-a, which is linear and may use beams in one dimension. As such, an analog beamforming codebook for antenna array 610-a and foldable state 605-a may be different than the analog beamforming codebook for antenna array 610-b and foldable state 605-b. In some cases, the analog beamforming codebook that corresponds to foldable state 605-a may be pre-loaded in a memory of UE 115-e (e.g., based on a default configuration for UE 115-e), but the analog beamforming codebook that corresponds to foldable state 605-b (or a partial roll or an intermediated foldable state between foldable state 605-a to foldable state 605-b) may not be pre-loaded in the memory of UE 115-e. Accordingly, UE 115-e may perform a codebook adaption procedure to determine the analog beamforming codebook that corresponds to foldable state 605-b similar to the procedures as described above with reference to FIGS. 2 and/or 3.

Other examples of flexible displays and foldings for a UE 115 may result in one or more antenna elements or antenna arrays to disappear (e.g., getting blocked due to form factor modifications) or may result in new shapes emerging. These different examples of foldable states may indicate that an appropriate analog beamforming codebook (e.g., of relevance) for the foldable state (which depends on subarray shapes and dimensions) may change depending on the nature of the rolling or folding state of the UE 115. Accordingly, an analog beamforming codebook for the UE 115 may need to be adapted based on the foldable state to determine the appropriate analog beamforming codebook, as described herein.

Additionally, it is to be understood that the antenna array placements as shown on the flexible wireless devices in FIGS. 4, 5, and 6 may be examples of antenna array placements on a UE 115. As described above in FIGS. 2 and 3, antenna arrays may be placed at different positions around the UE 115 (e.g., front face, back side, sides, bottom, top, etc.). As such, when the physical configuration of the UE 115 is changed (e.g., folded, bent, rolled, extended, etc.), the antenna arrays may change accordingly based on the changed physical configuration of the UE 115. The UE 115 may then proceed with a codebook adaptation procedure as described above to determine an analog beamforming codebook based on the changed physical configuration and the corresponding antenna arrays. Additionally, multiple antenna arrays may be placed around the UE 115, where one or more of the antenna arrays are affected by the physical configuration change, and the UE 115 performs the codebook adaptation based on the affected one or more antenna arrays.

Figure 7:
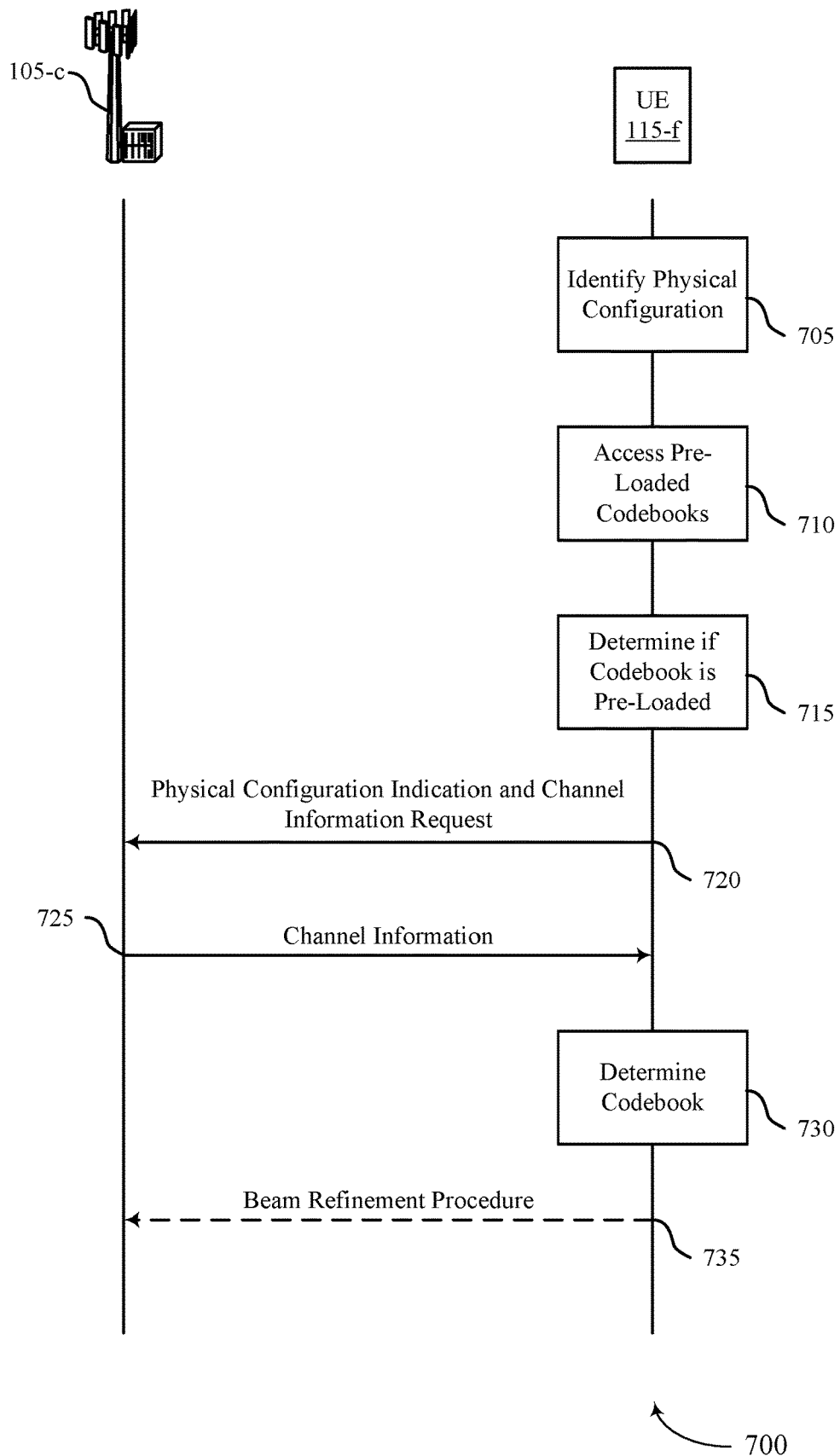
FIG. 7 illustrates an example of a process flow that supports beamforming codebook adaptation for flexible wireless devices in accordance with aspects of the present disclosure.

FIG. 7 illustrates an example of a process flow 700 that supports beamforming codebook adaptation for flexible wireless devices in accordance with aspects of the present disclosure. In some examples, process flow 700 may implement aspects of wireless communications systems 100, 200, and/or 300. Process flow 700 may include a base station 105-*c* and a UE 115-*f*, which may be examples of corresponding wireless devices as described above with respect to FIGS. 1-6. UE 115-*f* may include a flexible display as described herein. As such, an analog beamforming codebook may be determined for UE 115-*f* based on a physical configuration (e.g., foldable state) of its flexible display.

In the following description of the process flow 700, the operations between UE 115-*f* and base station 105-*c* may be performed in different orders or at different times. Certain operations may also be left out of the process flow 700, or other operations may be added to the process flow 700. It is to be understood that while UE 115-*f* is shown performing a number of the operations of process flow 700, any wireless device may perform the operations shown.

At 705, UE 115-*f* may identify a physical configuration (e.g., foldable state) of itself. In some cases, the identified physical configuration may include a set of antenna elements that forms an antenna array pattern that corresponds to the identified physical configuration. Additionally or alternatively, the identified physical configuration may include a foldable state of UE 115-*f* corresponding to different possible foldings of a flexible display unit. In some cases, UE 115-*f* may deactivate one or more antennas based on the identified physical configuration.

At 710, UE 115-*f* may access a set of analog beamforming codebooks pre-loaded in a memory of itself. In some cases, the pre-loaded analog beamforming codebooks may be associated with beamformed communications over a limited number of radio frequency chains with base station 105-*c*, where the number of radio frequency chains is smaller than a number of antenna elements of UE 115-*f*. Additionally, the pre-loaded analog beamforming codebooks may be stored in RFIC memory of UE 115-*f*.

At 715, UE 115-*f* may determine the identified physical configuration fails to correspond to at least one analog beamforming codebook pre-loaded in the memory of itself.

At 720, UE 115-*f* may transmit, to base station 105-*c*, signaling that includes an indication of the physical configuration of itself and a request for channel information for a subsequent communication with base station 105-*c*, where the transmitting is based on the identified physical configuration failing to correspond to at least one analog beamforming codebook pre-loaded in the memory of UE 115-*f*. In some cases, the request for channel information for subsequent communications with base station 105-*c* may include a request for a set of contiguous CSI-RS resources for an analog beamforming codebook determination.

Additionally, the indication of the identified physical configuration may include an explicit or an implicit indication of the physical configuration relative to past physical configurations of UE 115-*f*. In some cases, the indication of the identified physical configuration may include an indication of one or more antenna shapes, antenna subarrays, antenna dimensions, or a combination thereof for the physical configuration of UE 115-*f*. Additionally or alternatively, the indication of the identified physical configuration may include a quantized indication with a finite size. In some cases, the indication of the identified physical configuration may include information for a set of applications at a firmware layer, hardware layer, software layer, application layer, or a combination thereof for UE 115-*f*.

At 725, UE 115-*f* may receive, from base station 105-*c*, the channel information in response to the request. In some cases, UE 115-*f* may receive the set of contiguous CSI-RS resources as part of the channel information. In some cases, base station 105-*c* may determine the set of contiguous CSI-RS resources based on the identified physical configuration of UE 115-*f*. Additionally, base station 105-*c* may transmit the set of contiguous CSI-RS resources on a beam that is specific to the identified physical configuration to UE 115-*f*.

At 730, UE 115-*f* may determine an analog beamforming codebook corresponding to the identified physical configuration based on the received channel information, where the analog beamforming codebook is used for the subsequent communication with base station 105-*c* while in the identified physical configuration. Additionally or alternatively, UE 115-*f* may determine the analog beamforming codebook corresponding to the identified physical configuration based on the set of contiguous CSI-RS resources, where the analog beamforming codebook is used for the subsequent communication with the base station while in the identified physical configuration. In some cases, UE 115-*f* may use one or more sets of analog sampling beams over the set of contiguous CSI-RS resources to determine the analog beamforming codebook corresponding to the identified physical configuration.

Additionally or alternatively, UE 115-*f* may transmit, to a CPU within itself, sensor information regarding the identified physical configuration and generate, at the CPU, an analog beamforming codebook corresponding to the identified physical configuration based on the sensor information, where the analog beamforming codebook is used for the subsequent communication with base station 105-*c* while in the identified physical configuration. In some cases, the sensor information may include information from a potentiometer, a gyro, or a combination thereof. Additionally, UE 115-*f* may transmit, to a modem and an RFIC associated with the modem in itself, an indication of the generated analog beamforming codebook.

At 735, UE 115-*f* may transmit, to base station 105-*c*, a beam refinement procedure request based on the generated analog beamforming codebook for the identified physical configuration, where the beam refinement procedure request includes the request for channel information.

Figure 8:
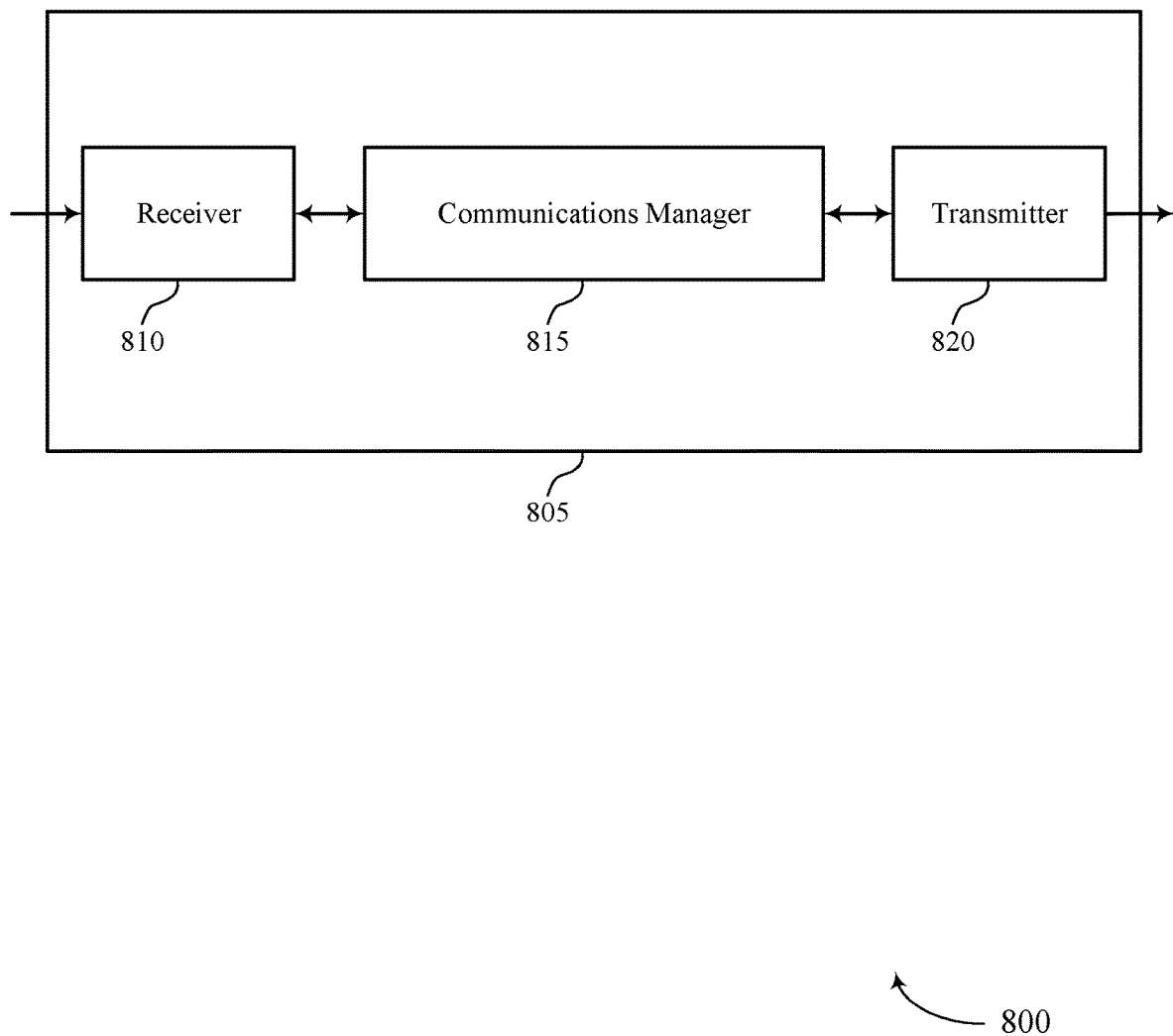
FIGS. 8 and 9 show block diagrams of devices that support beamforming codebook adaptation for flexible wireless devices in accordance with aspects of the present disclosure.

FIG. 8 shows a block diagram 800 of a device 805 that supports beamforming codebook adaptation for flexible wireless devices in accordance with aspects of the present disclosure. The device 805 may be an example of aspects of a wireless device (e.g., a UE 115) as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to beamforming codebook adaptation for flexible wireless devices, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a physical configuration of the wireless device (e.g., the UE). Additionally, the communications manager 815 may access a set of analog beamforming codebooks pre-loaded in a memory of the wireless device. In some cases, the communications manager 815 may determine the identified physical configuration fails to correspond to at least one analog beamforming codebook pre-loaded in the memory of the wireless device. Accordingly, the communications manager 815 may transmit, to a base station, signaling including an indication of the physical configuration of the wireless device and a request for channel information for a subsequent communication with the base station, the transmitting based on the identified physical configuration failing to correspond to at least one analog beamforming codebook pre-loaded in the memory of the wireless device. In some cases, the communications manager 815 may receive, from the base station, the channel information in response to the request. The communications manager 815 may be an example of aspects of the communications manager 1110 described herein.

Based on the actions performed by communications manager 815 as described herein, a wireless device (e.g., a UE 115) may improve its battery life. For example, after receiving the channel information from the base station, the wireless device may turn off one or more antennas, antenna elements, antenna arrays, etc., thereby reducing power consumption at the wireless device. Additionally, in some cases, the wireless device may reduce computation complexity based on the actions performed by the communications manager 815 by receiving the channel information from the base station, which may indicate at least in part an analog beamforming codebook for the wireless device to use rather than having the wireless device determine the analog beamforming codebook itself.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
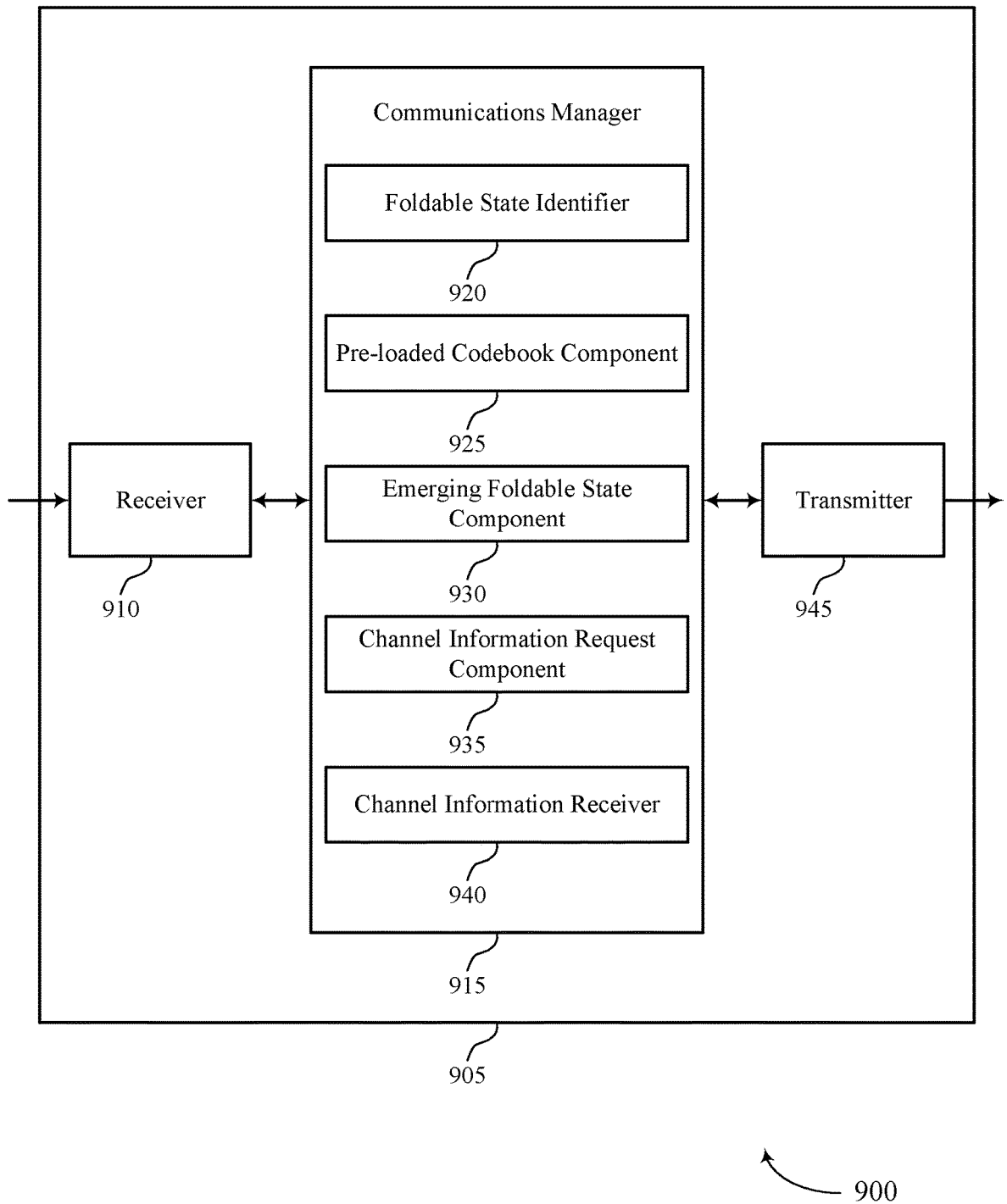

FIG. 9 shows a block diagram 900 of a device 905 that supports beamforming codebook adaptation for flexible wireless devices in accordance with aspects of the present disclosure. The device 905 may be an example of aspects of a device 805, or a wireless device (e.g., a UE 115) as described herein. The device 905 may include a receiver 910, a communications manager 915, and a transmitter 945. The device 905 may also include a processor. Each of these components may be in communication with one another (e.g., via one or more buses).

The receiver 910 may receive information such as packets, user data, or control information associated with various information channels (e.g., control channels, data channels, and information related to beamforming codebook adaptation for flexible wireless devices, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a foldable state identifier 920, a pre-loaded codebook component 925, an emerging foldable state component 930, a channel information request component 935, and a channel information receiver 940. The communications manager 915 may be an example of aspects of the communications manager 1110 described herein.

The foldable state identifier 920 may identify a physical configuration of the wireless device (e.g., the UE).

The pre-loaded codebook component 925 may access a set of analog beamforming codebooks pre-loaded in a memory of the wireless device.

The emerging foldable state component 930 may determine the identified physical configuration fails to correspond to at least one analog beamforming codebook pre-loaded in the memory of the wireless device.

The channel information request component 935 may transmit, to a base station, signaling including an indication of the physical configuration of the wireless device and a request for channel information for a subsequent communication with the base station, the transmitting based on the identified physical configuration failing to correspond to at least one analog beamforming codebook pre-loaded in the memory of the wireless device.

The channel information receiver 940 may receive, from the base station, the channel information in response to the request.

Based on transmitting an indication of the physical configuration of the wireless device, a processor of a wireless device (e.g., controlling the receiver 910, the transmitter 945, or a transceiver 1120 as described with reference to FIG. 7) may enable the wireless device to more efficiently determine an analog beamforming codebook to use for subsequent communications with a base station. For example, the base station may indicate the analog beamforming codebook for the wireless device to use or the wireless device may use channel information received from the base station to determine the analog beamforming codebook. By determining the analog beamforming codebook in such a way, the processor may reduce latency with determining the analog beamforming codebook via conventional means or using beams not ideal for a current or upcoming physical configuration of the wireless device. Additionally, processor may save battery power by identifying when the wireless device is able to turn off different components (e.g., display, antenna elements, etc.) based on the current or upcoming physical configuration.

The transmitter 945 may transmit signals generated by other components of the device 905. In some examples, the transmitter 945 may be collocated with a receiver 910 in a transceiver module. For example, the transmitter 945 may be an example of aspects of the transceiver 1120 described with reference to FIG. 11. The transmitter 945 may utilize a single antenna or a set of antennas.

Figure 10:
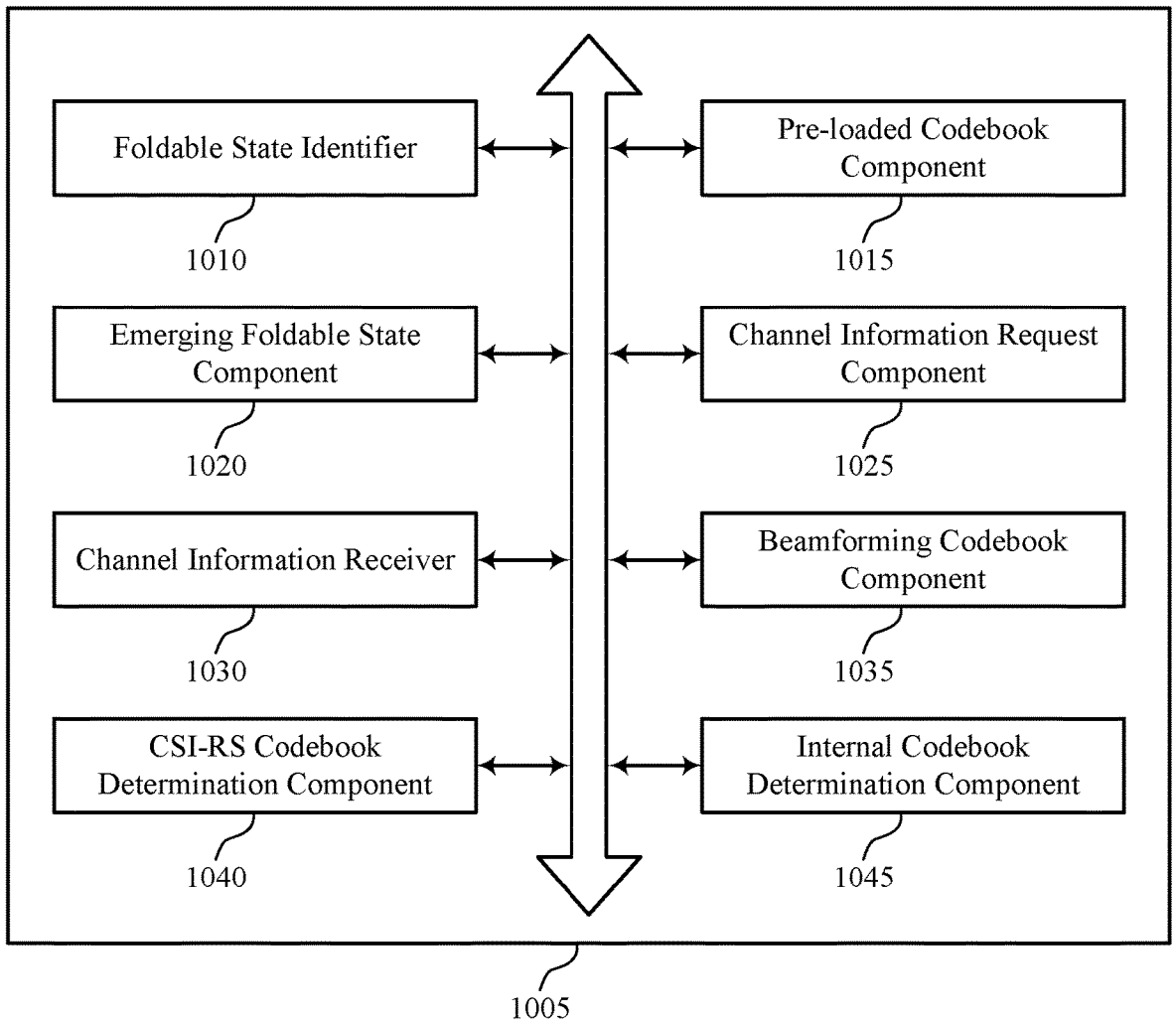
FIG. 10 shows a block diagram of a communications manager that supports beamforming codebook adaptation for flexible wireless devices in accordance with aspects of the present disclosure.

FIG. 10 shows a block diagram 1000 of a communications manager 1005 that supports beamforming codebook adaptation for flexible wireless devices in accordance with aspects of the present disclosure. The communications manager 1005 may be an example of aspects of a communications manager 815, a communications manager 915, or a communications manager 1110 described herein. The communications manager 1005 may include a foldable state identifier 1010, a pre-loaded codebook component 1015, an emerging foldable state component 1020, a channel information request component 1025, a channel information receiver 1030, a beamforming codebook component 1035, a CSI-RS codebook determination component 1040, and an internal codebook determination component 1045. Each of these modules may communicate, directly or indirectly, with one another (e.g., via one or more buses).

The foldable state identifier 1010 may identify a physical configuration of the wireless device (e.g., the UE). In some examples, the foldable state identifier 1010 may deactivate one or more antennas based on the identified physical configuration. In some cases, the identified physical configuration may include a set of antenna elements that forms an antenna array pattern that corresponds to the identified physical configuration. Additionally, the identified physical configuration may include a foldable state of the wireless device corresponding to different possible foldings of a flexible display unit.

The pre-loaded codebook component 1015 may access a set of analog beamforming codebooks pre-loaded in a memory of the wireless device. For example, the pre-loaded codebook component 1015 may access the set of analog beamforming codebooks available for the wireless device to use. In some cases, the pre-loaded analog beamforming codebooks may be associated with beamformed communications over a limited number of radio frequency chains with the base station, where the number of radio frequency chains is smaller than a number of antenna elements of the wireless device. Additionally, the pre-loaded analog beamforming codebooks may be stored in RFIC memory.

The emerging foldable state component 1020 may determine the identified physical configuration fails to correspond to at least one analog beamforming codebook pre-loaded in the memory of the wireless device.

The channel information request component 1025 may transmit, to a base station, signaling including an indication of the physical configuration of the wireless device and a request for channel information for a subsequent communication with the base station, the transmitting based on the identified physical configuration failing to correspond to at least one analog beamforming codebook pre-loaded in the memory of the wireless device. In some cases, the request for channel information for the subsequent communication with the base station may include a request for a set of contiguous CSI-RS resources for an analog beamforming codebook determination.

Additionally, the indication of the identified physical configuration may include an explicit or an implicit indication of the physical configuration relative to past physical configurations of the wireless device. In some cases, the indication of the identified physical configuration may include an indication of one or more antenna shapes, antenna subarrays, antenna dimensions, or a combination thereof for the physical configuration of the wireless device. Additionally, the indication of the identified physical configuration may include a quantized indication with a finite size. In some cases, the indication of the identified physical configuration may include information for a set of applications at a firmware layer, hardware layer, software layer, application layer, or a combination thereof for the wireless device.

The channel information receiver 1030 may receive, from the base station, the channel information in response to the request.

The beamforming codebook component 1035 may determine an analog beamforming codebook corresponding to the identified physical configuration based on the received channel information, where the analog beamforming codebook is used for the subsequent communication with the base station while in the identified physical configuration.

The CSI-RS codebook determination component 1040 may receive, from the base station, the set of contiguous CSI-RS resources. In some examples, the CSI-RS codebook determination component 1040 may determine an analog beamforming codebook corresponding to the identified physical configuration based on the set of contiguous CSI-RS resources, where the analog beamforming codebook is used for the subsequent communication with the base station while in the identified physical configuration. Additionally or alternatively, the CSI-RS codebook determination component 1040 may use a set of analog sampling beams over the set of contiguous CSI-RS resources to determine the analog beamforming codebook corresponding to the identified physical configuration.

The internal codebook determination component 1045 may transmit, to a CPU within the wireless device, sensor information regarding the identified physical configuration. In some examples, the internal codebook determination component 1045 may generate, at the CPU, an analog beamforming codebook corresponding to the identified physical configuration based on the sensor information, where the analog beamforming codebook is used for the subsequent communication with the base station while in the identified physical configuration. Additionally, the internal codebook determination component 1045 may transmit, to a modem and an RFIC associated with the modem in the wireless device, an indication of the generated analog beamforming codebook. In some examples, the internal codebook determination component 1045 may transmit, to the base station, a beam refinement procedure request based on the generated analog beamforming codebook for the identified physical configuration, where the beam refinement procedure request includes the request for channel information. In some cases, the sensor information may include information from a potentiometer, a gyro, or a combination thereof.

Figure 11:
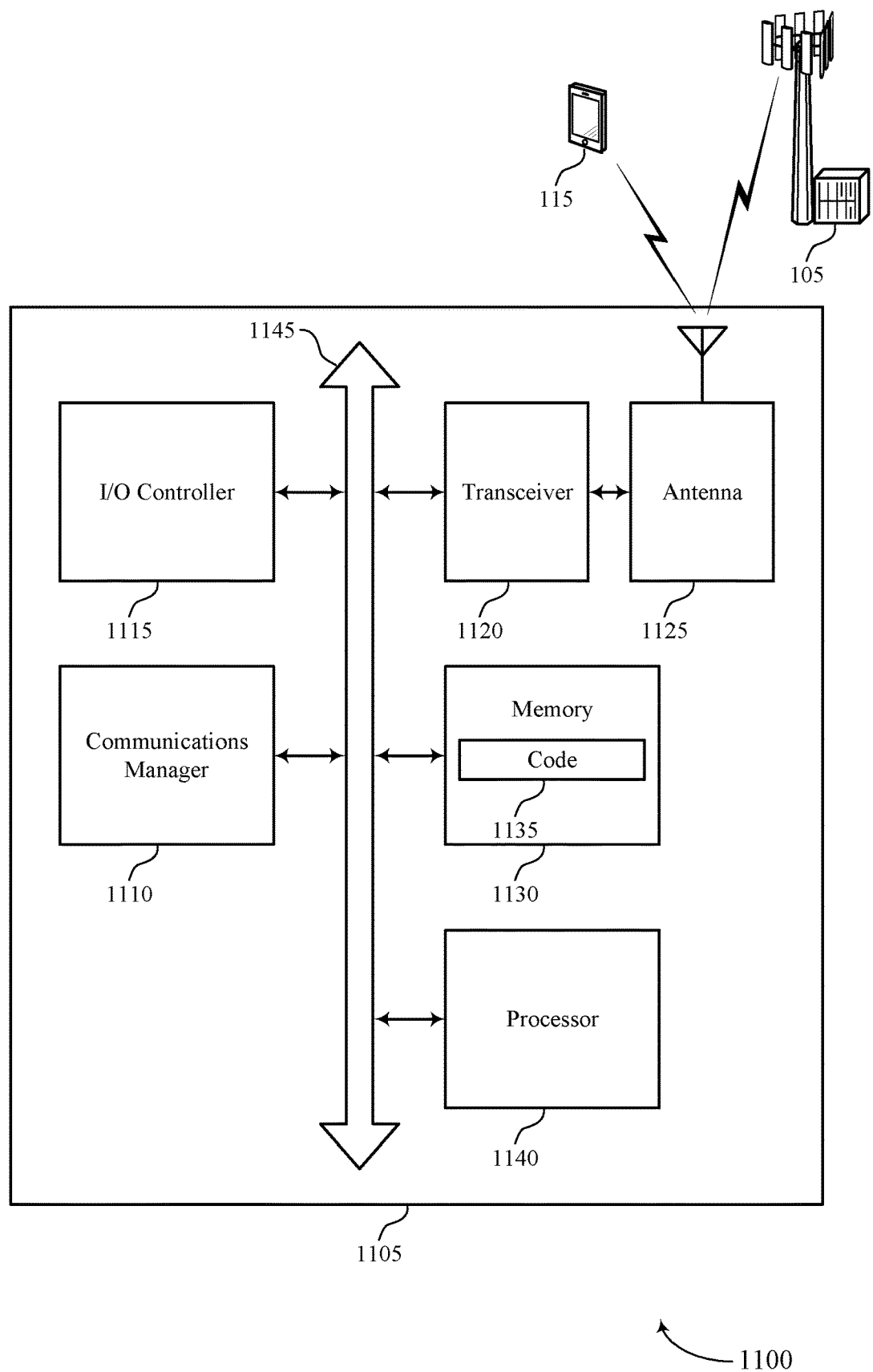
FIG. 11 shows a diagram of a system including a device that supports beamforming codebook adaptation for flexible wireless devices in accordance with aspects of the present disclosure.

FIG. 11 shows a diagram of a system 1100 including a device 1105 that supports beamforming codebook adaptation for flexible wireless devices in accordance with aspects of the present disclosure. The device 1105 may be an example of or include the components of device 805, device 905, or a wireless device (e.g., a UE 115) as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify a physical configuration of the wireless device (e.g., the UE). Additionally, the communications manager 1110 may access a set of analog beamforming codebooks pre-loaded in a memory of the wireless device. In some cases, the communications manager 1110 may determine the identified physical configuration fails to correspond to at least one analog beamforming codebook pre-loaded in the memory of the wireless device. Accordingly, the communications manager 1110 may transmit, to a base station, signaling including an indication of the physical configuration of the wireless device and a request for channel information for a subsequent communication with the base station, the transmitting based on the identified physical configuration failing to correspond to at least one analog beamforming codebook pre-loaded in the memory of the wireless device. In some cases, the communications manager 1110 may receive, from the base station, the channel information in response to the request.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting beamforming codebook adaptation for flexible wireless devices).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
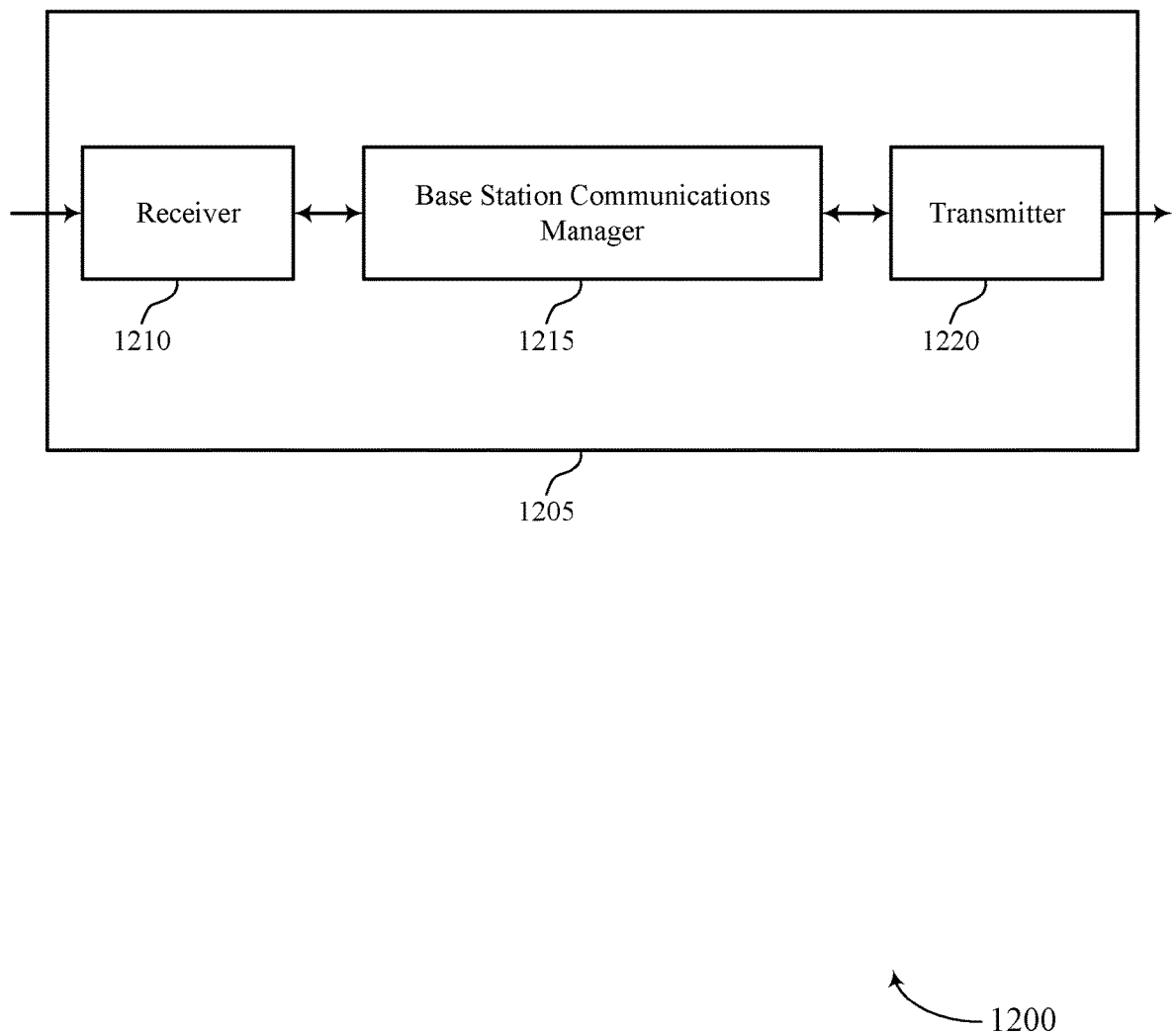
FIGS. 12 and 13 show block diagrams of devices that support beamforming codebook adaptation for flexible wireless devices in accordance with aspects of the present disclosure.

FIG. 12 shows a block diagram 1200 of a device 1205 that supports beamforming codebook adaptation for flexible wireless devices in accordance with aspects of the present disclosure. The device 1205 may be an example of aspects of a base station 105 as described herein. The device 1205 may include a receiver 1210, a base station communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to beamforming codebook adaptation for flexible wireless devices, etc.). Information may be passed on to other components of the device 1205. The receiver 1210 may be an example of aspects of the transceiver 1520 described with reference to FIG. 15. The receiver 1210 may utilize a single antenna or a set of antennas.

The base station communications manager 1215 may receive, from a wireless device (e.g., a UE), signaling including an indication of a physical configuration for the wireless device. Additionally, the base station communications manager 1215 may receive, from the wireless device, a request for channel information corresponding to the physical configuration. In some cases, the base station communications manager 1215 may transmit, to the wireless device, the channel information in response to the request. The base station communications manager 1215 may be an example of aspects of the base station communications manager 1510 described herein.

The base station communications manager 1215, or its sub-components, may be implemented in hardware, code (e.g., software or firmware) executed by a processor, or any combination thereof. If implemented in code executed by a processor, the functions of the base station communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1215, or its sub-components, may be physically located at various positions, including being distributed such that portions of functions are implemented at different physical locations by one or more physical components. In some examples, the base station communications manager 1215, or its sub-components, may be a separate and distinct component in accordance with various aspects of the present disclosure. In some examples, the base station communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
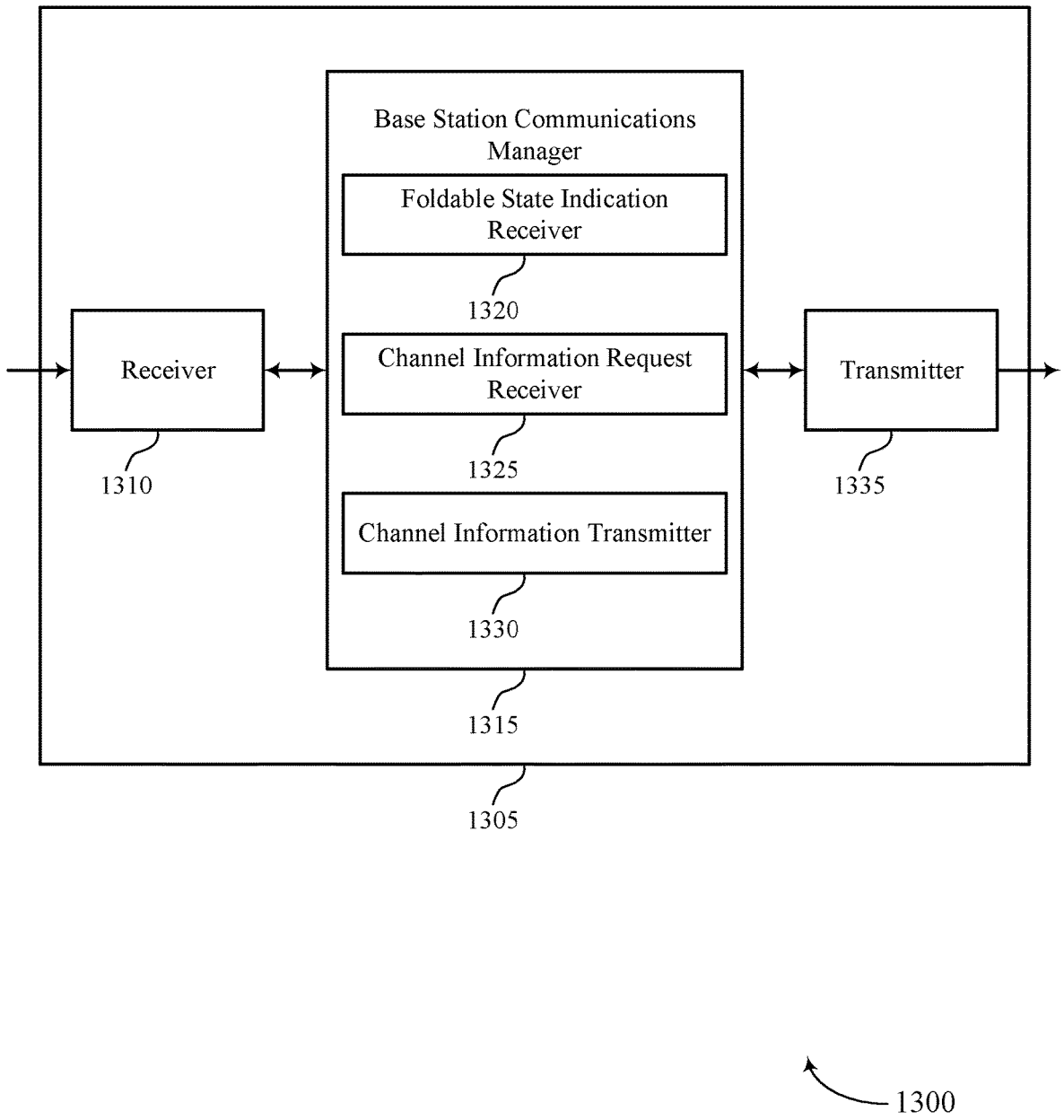

FIG. 13 shows a block diagram 1300 of a device 1305 that supports beamforming codebook adaptation for flexible wireless devices in accordance with aspects of the present disclosure. The device 1305 may be an example of aspects of a device 1205, or a base station 105 as described herein. The device 1305 may include a receiver 1310, a base station communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to beamforming codebook adaptation for flexible wireless devices, etc.). Information may be passed on to other components of the device 1305. The receiver 1310 may be an example of aspects of the transceiver 1520 described with reference to FIG. 15. The receiver 1310 may utilize a single antenna or a set of antennas.

The base station communications manager 1315 may be an example of aspects of the base station communications manager 1215 as described herein. The base station communications manager 1315 may include a foldable state indication receiver 1320, a channel information request receiver 1325, and a channel information transmitter 1330. The base station communications manager 1315 may be an example of aspects of the base station communications manager 1510 described herein.

The foldable state indication receiver 1320 may receive, from a wireless device (e.g., a UE), signaling including an indication of an identified physical configuration for the wireless device.

The channel information request receiver 1325 may receive, from the wireless device, a request for channel information corresponding to the identified physical configuration.

The channel information transmitter 1330 may transmit, to the wireless device, the channel information in response to the request.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
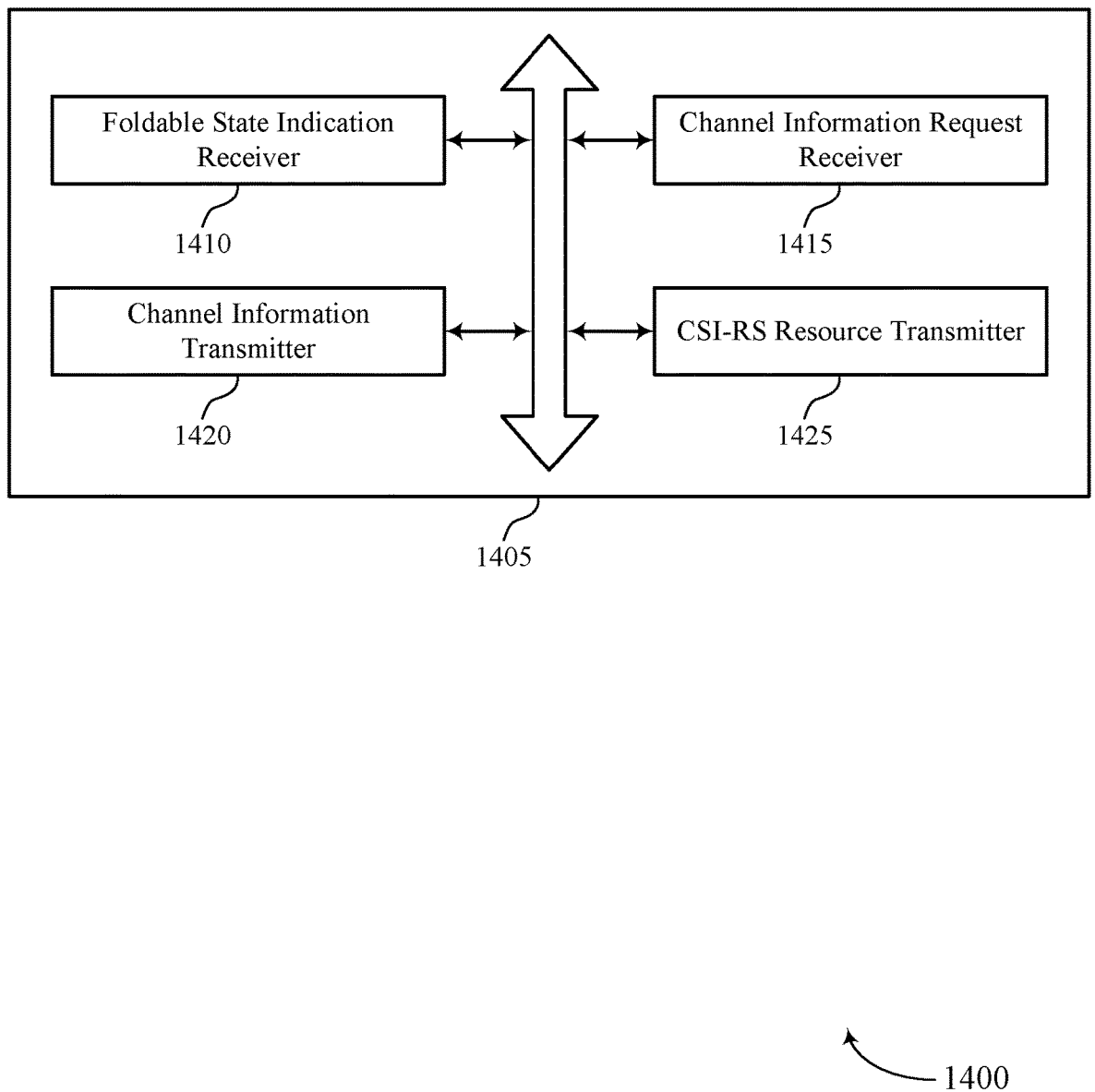
FIG. 14 shows a block diagram of a base station communications manager that supports beamforming codebook adaptation for flexible wireless devices in accordance with aspects of the present disclosure.

FIG. 14 shows a block diagram 1400 of a base station communications manager 1405 that supports beamforming codebook adaptation for flexible wireless devices in accordance with aspects of the present disclosure. The base station communications manager 1405 may be an example of aspects of a base station communications manager 1215, a base station communications manager 1315, or a base station communications manager 1510 described herein. The base station communications manager 1405 may include a foldable state indication receiver 1410, a channel information request receiver 1415, a channel information transmitter 1420, and a CSI-RS resource transmitter 1425. Each of these modules may communicate, directly or indirectly, with one another (e.g., via one or more buses).

The foldable state indication receiver 1410 may receive, from a wireless device (e.g., a UE), signaling including an indication of a physical configuration for the wireless device. In some cases, the indication of the physical configuration may include an explicit or an implicit indication of the physical configuration relative to past physical configurations of the wireless device. Additionally, the indication of the physical configuration may include an indication of antenna shapes, antenna subarrays, antenna dimensions, or a combination thereof for the physical configuration of the wireless device. In some cases, the indication of the physical configuration may include a quantized indication with a finite size. Additionally, the indication of the physical configuration may include information for a set of applications at a firmware layer, hardware layer, software layer, application layer, or a combination thereof for the wireless device.

In some cases, the physical configuration may include a set of antenna elements that forms an antenna array pattern that corresponds to the physical configuration. Additionally or alternatively, the physical configuration may include a foldable state of the wireless device corresponding to different possible foldings of a flexible display unit.

The channel information request receiver 1415 may receive, from the wireless device, a request for channel information corresponding to the physical configuration.

The channel information transmitter 1420 may transmit, to the wireless device, the channel information in response to the request. In some cases, the channel information may be associated with beamformed communications with the wireless device.

The CSI-RS resource transmitter 1425 may transmit, to the wireless device, a set of contiguous CSI-RS resources, where the CSI-RS resources are determined based on the indication of the physical configuration. In some examples, the CSI-RS resource transmitter 1425 may transmit the set of contiguous CSI-RS resources on a beam that is specific to the physical configuration to the wireless device.

Figure 15:
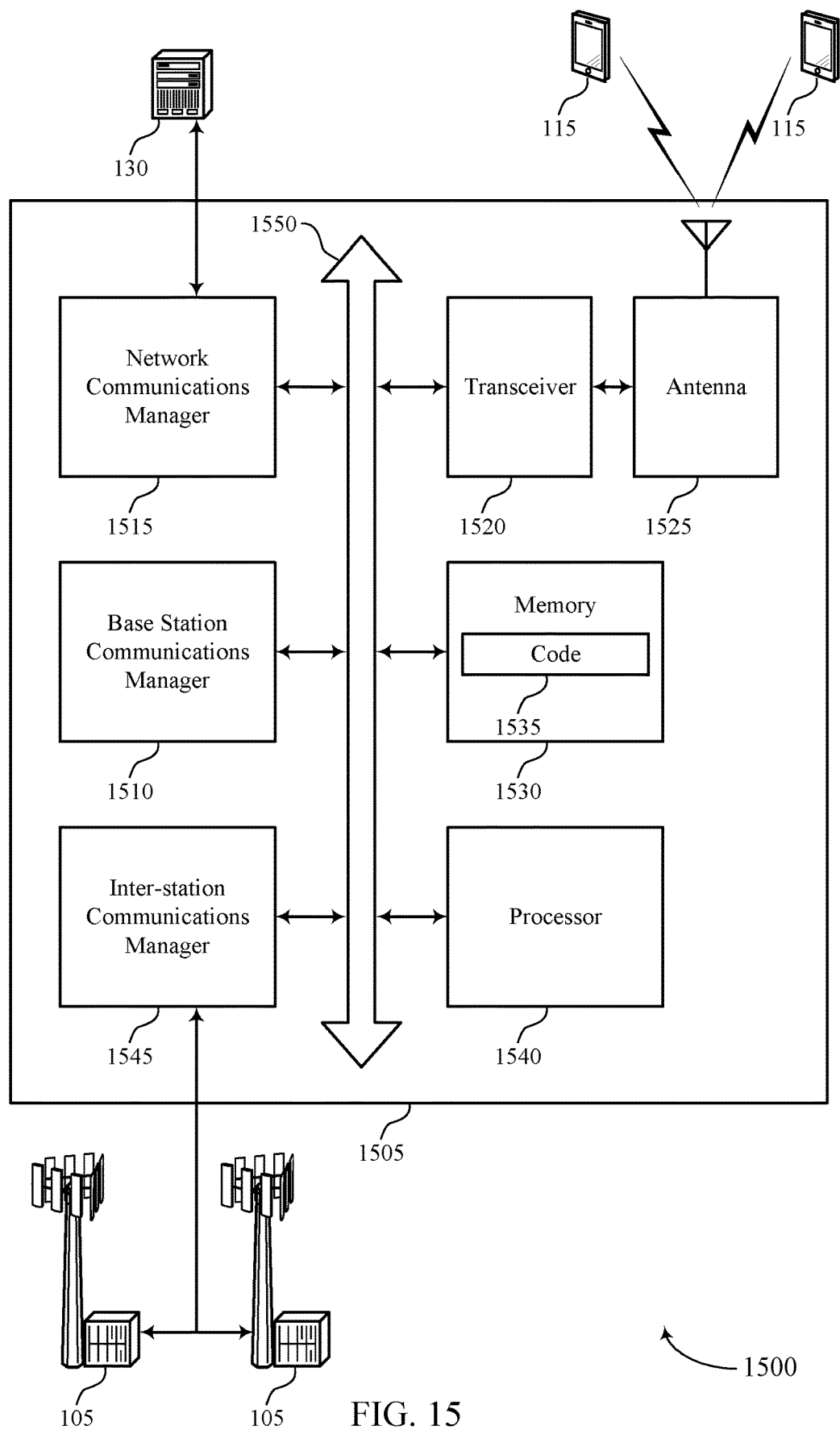
FIG. 15 shows a diagram of a system including a device that supports beamforming codebook adaptation for flexible wireless devices in accordance with aspects of the present disclosure.

FIG. 15 shows a diagram of a system 1500 including a device 1505 that supports beamforming codebook adaptation for flexible wireless devices in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a base station communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The base station communications manager 1510 may receive, from a wireless device (e.g., a UE), signaling including an indication of a physical configuration for the wireless device. Additionally, the base station communications manager 1510 may receive, from the wireless device, a request for channel information corresponding to the physical configuration. In some cases, the base station communications manager 1510 may transmit, to the wireless device, the channel information in response to the request.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting beamforming codebook adaptation for flexible wireless devices).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
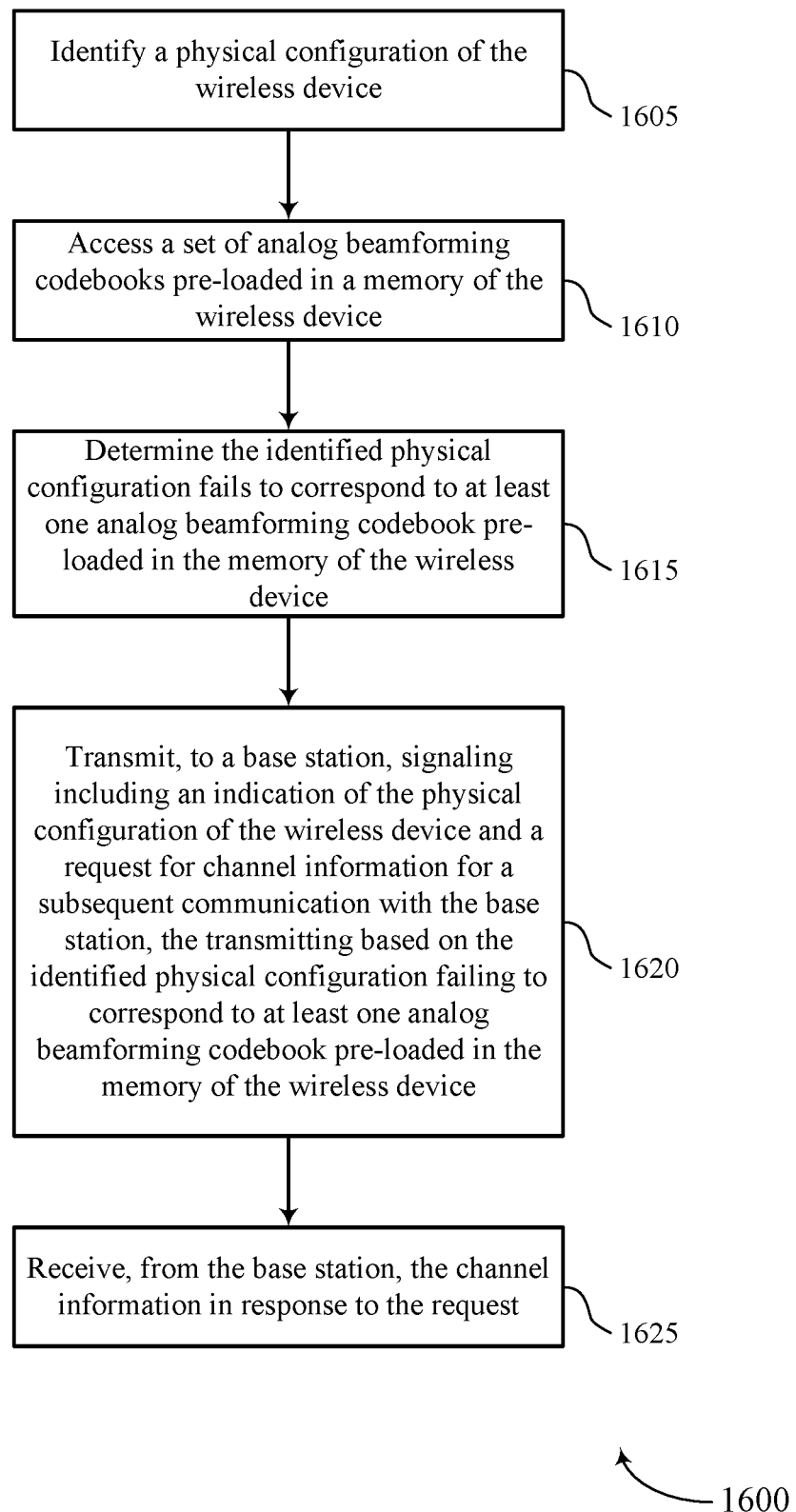
FIGS. 16 through 20 show flowcharts illustrating methods that support beamforming codebook adaptation for flexible wireless devices in accordance with aspects of the present disclosure.

FIG. 16 shows a flowchart illustrating a method 1600 that supports beamforming codebook adaptation for flexible wireless devices in accordance with aspects of the present disclosure. The operations of method 1600 may be implemented by a wireless device (e.g., a UE 115) or its components as described herein. For example, the operations of method 1600 may be performed by a communications manager as described with reference to FIGS. 8 through 11. In some examples, a wireless device may execute a set of instructions to control the functional elements of the wireless device to perform the functions described below. Additionally or alternatively, a wireless device may perform aspects of the functions described below using special-purpose hardware.

At 1605, the wireless device may identify a physical configuration of the wireless device. The operations of 1605 may be performed according to the methods described herein. In some examples, aspects of the operations of 1605 may be performed by a foldable state identifier as described with reference to FIGS. 8 through 11.

At 1610, the wireless device may access a set of analog beamforming codebooks pre-loaded in a memory of the wireless device. The operations of 1610 may be performed according to the methods described herein. In some examples, aspects of the operations of 1610 may be performed by a pre-loaded codebook component as described with reference to FIGS. 8 through 11.

At 1615, the wireless device may determine the identified physical configuration fails to correspond to at least one analog beamforming codebook pre-loaded in the memory of the wireless device. The operations of 1615 may be performed according to the methods described herein. In some examples, aspects of the operations of 1615 may be performed by an emerging foldable state component as described with reference to FIGS. 8 through 11.

At 1620, the wireless device may transmit, to a base station, signaling including an indication of the physical configuration of the wireless device and a request for channel information for a subsequent communication with the base station, the transmitting based on the identified physical configuration failing to correspond to at least one analog beamforming codebook pre-loaded in the memory of the wireless device. The operations of 1620 may be performed according to the methods described herein. In some examples, aspects of the operations of 1620 may be performed by a channel information request component as described with reference to FIGS. 8 through 11.

At 1625, the wireless device may receive, from the base station, the channel information in response to the request. The operations of 1625 may be performed according to the methods described herein. In some examples, aspects of the operations of 1625 may be performed by a channel information receiver as described with reference to FIGS. 8 through 11.

Figure 17:
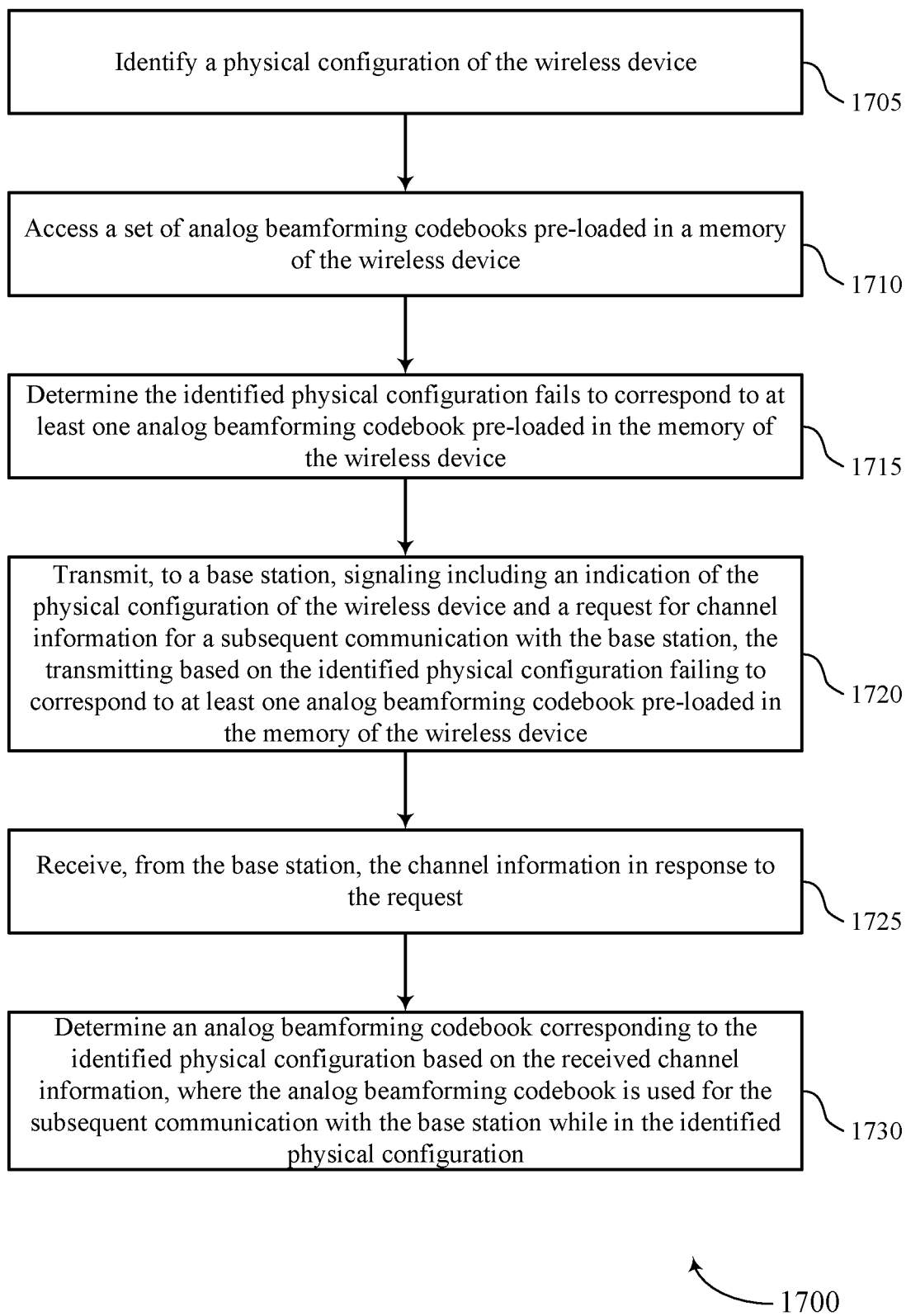

FIG. 17 shows a flowchart illustrating a method 1700 that supports beamforming codebook adaptation for flexible wireless devices in accordance with aspects of the present disclosure. The operations of method 1700 may be implemented by a wireless device (e.g., a UE 115) or its components as described herein. For example, the operations of method 1700 may be performed by a communications manager as described with reference to FIGS. 8 through 11. In some examples, a wireless device may execute a set of instructions to control the functional elements of the wireless device to perform the functions described below. Additionally or alternatively, a wireless device may perform aspects of the functions described below using special-purpose hardware.

At 1705, the wireless device may identify a physical configuration of the wireless device. The operations of 1705 may be performed according to the methods described herein. In some examples, aspects of the operations of 1705 may be performed by a foldable state identifier as described with reference to FIGS. 8 through 11.

At 1710, the wireless device may access a set of analog beamforming codebooks pre-loaded in a memory of the wireless device. The operations of 1710 may be performed according to the methods described herein. In some examples, aspects of the operations of 1710 may be performed by a pre-loaded codebook component as described with reference to FIGS. 8 through 11.

At 1715, the wireless device may determine the identified physical configuration fails to correspond to at least one analog beamforming codebook pre-loaded in the memory of the wireless device. The operations of 1715 may be performed according to the methods described herein. In some examples, aspects of the operations of 1715 may be performed by an emerging foldable state component as described with reference to FIGS. 8 through 11.

At 1720, the wireless device may transmit, to a base station, signaling including an indication of the physical configuration of the wireless device and a request for channel information for a subsequent communication with the base station, the transmitting based on the identified physical configuration failing to correspond to at least one analog beamforming codebook pre-loaded in the memory of the wireless device. The operations of 1720 may be performed according to the methods described herein. In some examples, aspects of the operations of 1720 may be performed by a channel information request component as described with reference to FIGS. 8 through 11.

At 1725, the wireless device may receive, from the base station, the channel information in response to the request. The operations of 1725 may be performed according to the methods described herein. In some examples, aspects of the operations of 1725 may be performed by a channel information receiver as described with reference to FIGS. 8 through 11.

At 1730, the wireless device may determine an analog beamforming codebook corresponding to the identified physical configuration based on the received channel information, where the analog beamforming codebook is used for the subsequent communication with the base station while in the identified physical configuration. The operations of 1730 may be performed according to the methods described herein. In some examples, aspects of the operations of 1730 may be performed by a beamforming codebook component as described with reference to FIGS. 8 through 11.

Figure 18:
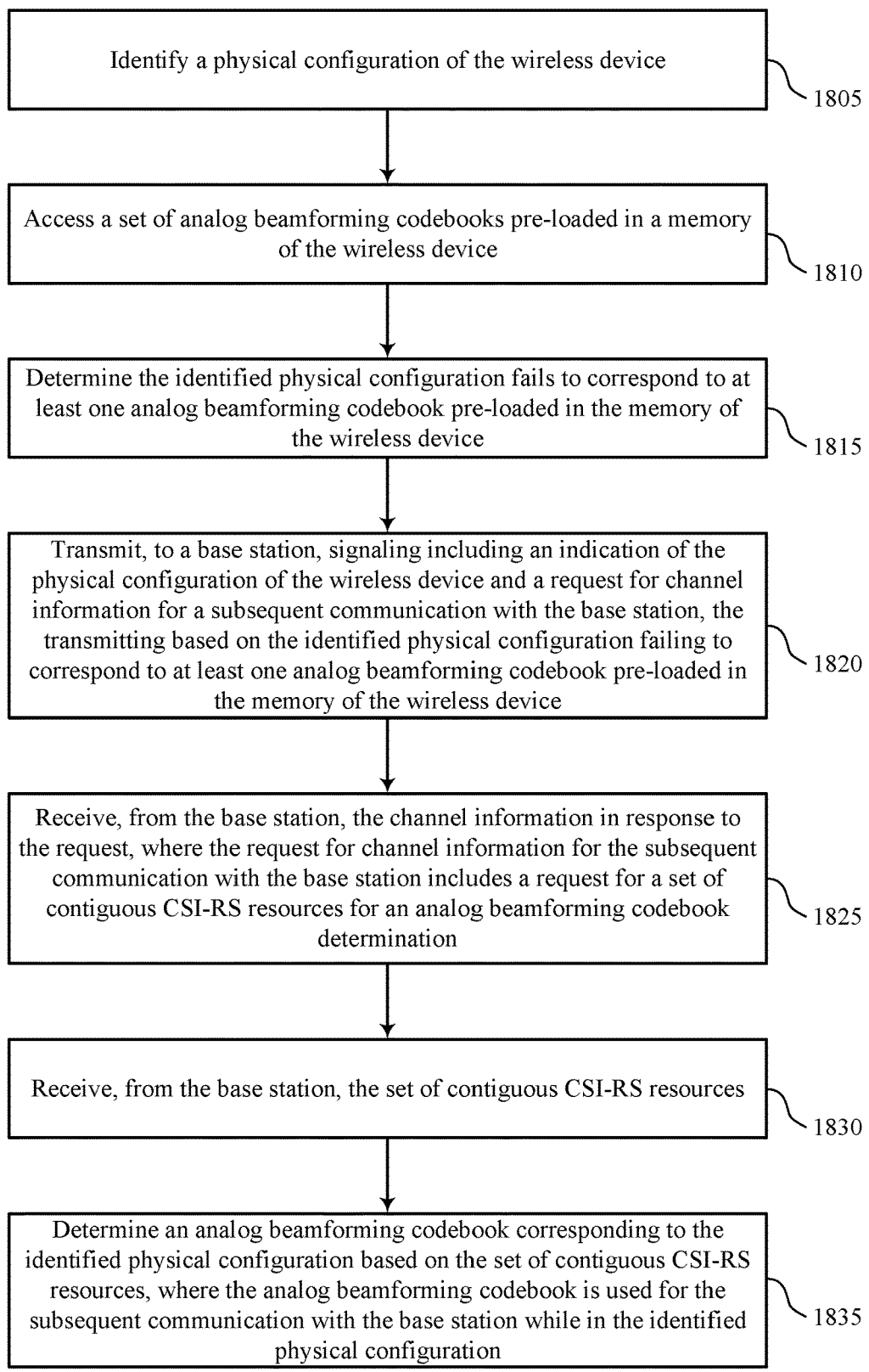

FIG. 18 shows a flowchart illustrating a method 1800 that supports beamforming codebook adaptation for flexible wireless devices in accordance with aspects of the present disclosure. The operations of method 1800 may be implemented by a wireless device (e.g., UE 115) or its components as described herein. For example, the operations of method 1800 may be performed by a communications manager as described with reference to FIGS. 8 through 11. In some examples, a wireless device may execute a set of instructions to control the functional elements of the wireless device to perform the functions described below. Additionally or alternatively, a wireless device may perform aspects of the functions described below using special-purpose hardware.

At 1805, the wireless device may identify a physical configuration of the wireless device. The operations of 1805 may be performed according to the methods described herein. In some examples, aspects of the operations of 1805 may be performed by a foldable state identifier as described with reference to FIGS. 8 through 11.

At 1810, the wireless device may access a set of analog beamforming codebooks pre-loaded in a memory of the wireless device. The operations of 1810 may be performed according to the methods described herein. In some examples, aspects of the operations of 1810 may be performed by a pre-loaded codebook component as described with reference to FIGS. 8 through 11.

At 1815, the wireless device may determine the identified physical configuration fails to correspond to at least one analog beamforming codebook pre-loaded in the memory of the wireless device. The operations of 1815 may be performed according to the methods described herein. In some examples, aspects of the operations of 1815 may be performed by an emerging foldable state component as described with reference to FIGS. 8 through 11.

At 1820, the wireless device may transmit, to a base station, signaling including an indication of the physical configuration of the wireless device and a request for channel information for a subsequent communication with the base station, the transmitting based on the identified physical configuration failing to correspond to at least one analog beamforming codebook pre-loaded in the memory of the wireless device. The operations of 1820 may be performed according to the methods described herein. In some examples, aspects of the operations of 1820 may be performed by a channel information request component as described with reference to FIGS. 8 through 11.

At 1825, the wireless device may receive, from the base station, the channel information in response to the request. In some cases, the request for channel information for the subsequent communication with the base station may include a request for a set of contiguous CSI-RS resources for an analog beamforming codebook determination. The operations of 1825 may be performed according to the methods described herein. In some examples, aspects of the operations of 1825 may be performed by a channel information receiver as described with reference to FIGS. 8 through 11.

At 1830, the wireless device may receive, from the base station, the set of contiguous CSI-RS resources. The operations of 1830 may be performed according to the methods described herein. In some examples, aspects of the operations of 1830 may be performed by a CSI-RS codebook determination component as described with reference to FIGS. 8 through 11.

At 1835, the wireless device may determine an analog beamforming codebook corresponding to the identified physical configuration based on the set of contiguous CSI-RS resources, where the analog beamforming codebook is used for the subsequent communication with the base station while in the identified physical configuration. The operations of 1835 may be performed according to the methods described herein. In some examples, aspects of the operations of 1835 may be performed by a CSI-RS codebook determination component as described with reference to FIGS. 8 through 11.

Figure 19:
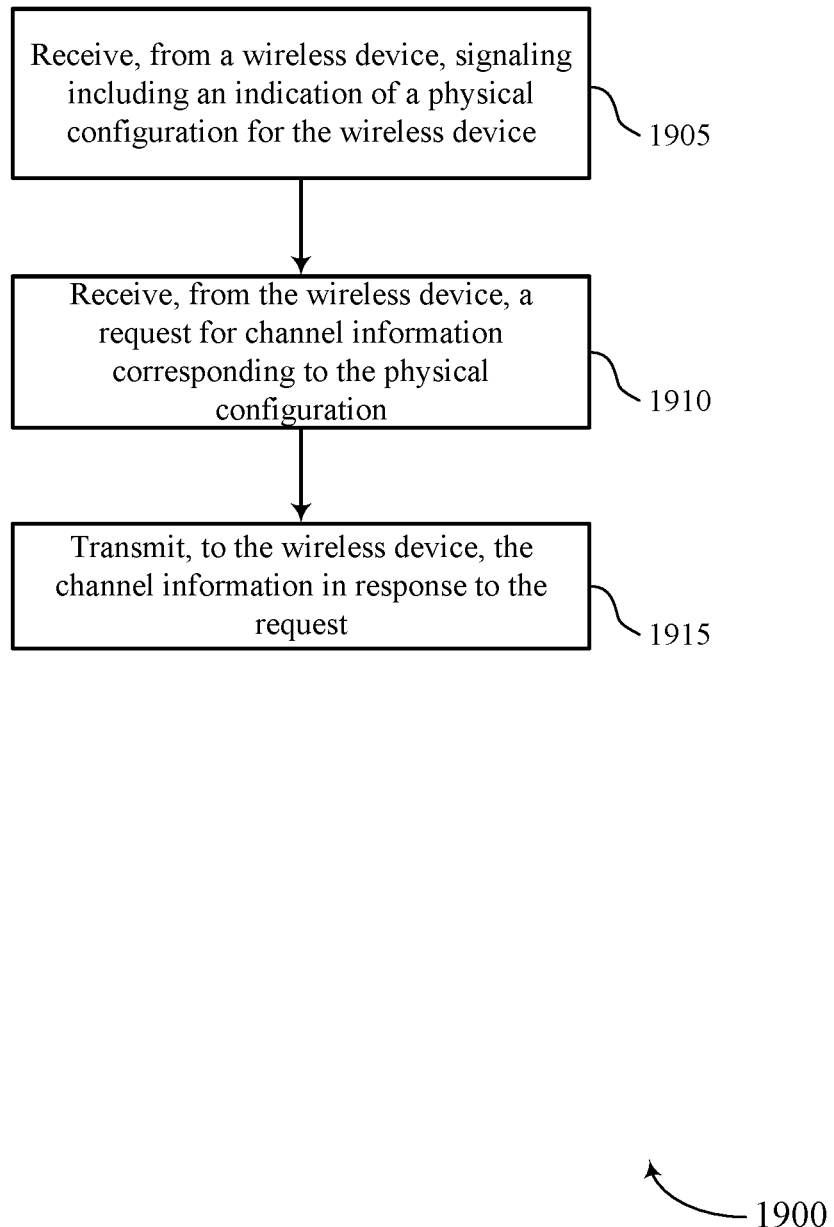

FIG. 19 shows a flowchart illustrating a method 1900 that supports beamforming codebook adaptation for flexible wireless devices in accordance with aspects of the present disclosure. The operations of method 1900 may be implemented by a base station 105 or its components as described herein. For example, the operations of method 1900 may be performed by a base station communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may receive, from a wireless device, signaling including an indication of a physical configuration for the wireless device. The operations of 1905 may be performed according to the methods described herein. In some examples, aspects of the operations of 1905 may be performed by a foldable state indication receiver as described with reference to FIGS. 12 through 15.

At 1910, the base station may receive, from the wireless device, a request for channel information corresponding to the physical configuration. The operations of 1910 may be performed according to the methods described herein. In some examples, aspects of the operations of 1910 may be performed by a channel information request receiver as described with reference to FIGS. 12 through 15.

At 1915, the base station may transmit, to the wireless device, the channel information in response to the request. The operations of 1915 may be performed according to the methods described herein. In some examples, aspects of the operations of 1915 may be performed by a channel information transmitter as described with reference to FIGS. 12 through 15.

Figure 20:
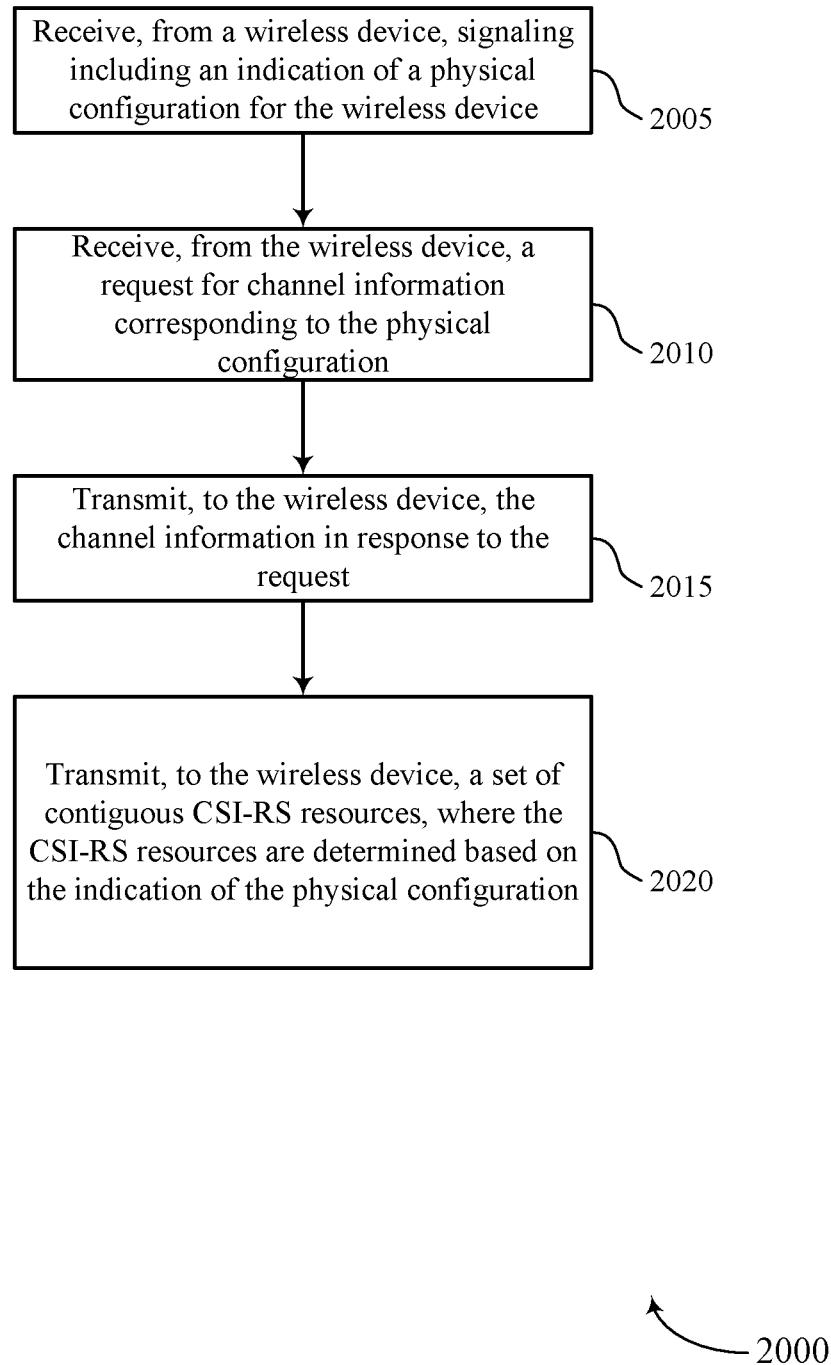

FIG. 20 shows a flowchart illustrating a method 2000 that supports beamforming codebook adaptation for flexible wireless devices in accordance with aspects of the present disclosure. The operations of method 2000 may be implemented by a base station 105 or its components as described herein. For example, the operations of method 2000 may be performed by a base station communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may receive, from a wireless device, signaling including an indication of a physical configuration for the wireless device. The operations of 2005 may be performed according to the methods described herein. In some examples, aspects of the operations of 2005 may be performed by a foldable state indication receiver as described with reference to FIGS. 12 through 15.

At 2010, the base station may receive, from the wireless device, a request for channel information corresponding to the physical configuration. The operations of 2010 may be performed according to the methods described herein. In some examples, aspects of the operations of 2010 may be performed by a channel information request receiver as described with reference to FIGS. 12 through 15.

At 2015, the base station may transmit, to the wireless device, the channel information in response to the request. The operations of 2015 may be performed according to the methods described herein. In some examples, aspects of the operations of 2015 may be performed by a channel information transmitter as described with reference to FIGS. 12 through 15.

At 2020, the base station may transmit, to the wireless device, a set of contiguous CSI-RS resources, where the CSI-RS resources are determined based on the indication of the physical configuration. The operations of 2020 may be performed according to the methods described herein. In some examples, aspects of the operations of 2020 may be performed by a CSI-RS resource transmitter as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

Example 1: A method for wireless communications at a wireless device, comprising: transmitting, to a base station, signaling comprising an indication of a physical configuration of the wireless device and a request for channel information for a subsequent communication with the base station, the transmitting based at least in part on the physical configuration of the wireless device failing to correspond to at least one analog beamforming codebook of the wireless device; and receiving, from the base station, the channel information in response to the request.

Example 2: The method of example 1, further comprising: identifying the physical configuration of the wireless device; accessing a plurality of analog beamforming codebooks available for the wireless device to use; and determining the identified physical configuration fails to correspond to at least one analog beamforming codebook of the wireless device from the plurality of analog beamforming codebooks.

Example 3: The method of example 2, wherein accessing the plurality of analog beamforming codebooks comprises: accessing a plurality of pre-loaded analog beamforming codebooks in memory of the wireless device.

Example 4: The method of example 3, wherein the plurality of pre-loaded analog beamforming codebooks is associated with beamformed communications over a limited number of radio frequency chains with the base station, wherein the number of radio frequency chains is smaller than a number of antenna elements of the wireless device.

Example 5: The method of example 3, wherein the plurality of pre-loaded analog beamforming codebooks is stored in radio frequency integrated circuit (RFIC) memory.

Example 6: The method of any of examples 1 to 5, further comprising: determining an analog beamforming codebook corresponding to the physical configuration based at least in part on the received channel information, wherein the analog beamforming codebook is used for the subsequent communication with the base station while in the physical configuration.

Example 7: The method of any of examples 1 to 6, wherein the request for channel information for the subsequent communication with the base station comprises a request for a plurality of contiguous channel state information reference signal (CSI-RS) resources for an analog beamforming codebook determination.

Example 8: The method of example 7, further comprising: receiving, from the base station, the plurality of contiguous channel state information reference signal (CSI-RS) resources; and determining an analog beamforming codebook corresponding to the physical configuration based at least in part on the plurality of contiguous CSI-RS resources, wherein the analog beamforming codebook is used for the subsequent communication with the base station while in the physical configuration.

Example 9: The method of example 8, further comprising: using a plurality of sets of analog sampling beams over the plurality of contiguous CSI-RS resources to determine the analog beamforming codebook corresponding to the physical configuration.

Example 10: The method of any of examples 1 to 9, wherein the indication of the physical configuration comprises an explicit or an implicit indication of the physical configuration relative to past physical configurations of the wireless device.

Example 11: The method of any of examples 1 to 10, wherein the indication of the physical configuration comprises an indication of one or more antenna shapes, antenna subarrays, antenna dimensions, or a combination thereof for the physical configuration of the wireless device.

Example 12: The method of any of examples 1 to 11, wherein the indication of the physical configuration comprises a quantized indication with a finite size.

Example 13: The method of any of examples 1 to 12, wherein the indication of the physical configuration comprises information for a plurality of applications at a firmware layer, hardware layer, software layer, application layer, or a combination thereof for the wireless device.

Example 14: The method of any of examples 1 to 13, further comprising: transmitting, to a central processing unit (CPU) within the wireless device, sensor information regarding the physical configuration; and generating, at the CPU, an analog beamforming codebook corresponding to the physical configuration based at least in part on the sensor information, wherein the analog beamforming codebook is used for the subsequent communication with the base station while in the physical configuration.

Example 15: The method of example 14, further comprising: transmitting, to a modem and a radio frequency integrated circuit (RFIC) associated with the modem in the wireless device, an indication of the generated analog beamforming codebook.

Example 16: The method of example 14, further comprising: transmitting, to the base station, a beam refinement procedure request based at least in part on the generated analog beamforming codebook for the physical configuration, wherein the beam refinement procedure request comprises the request for channel information.

Example 17: The method of example 14, wherein the sensor information comprises information from a potentiometer, a gyro, or a combination thereof.

Example 18: The method of any of examples 1 to 17, further comprising: deactivating one or more antennas based at least in part on the physical configuration.

Example 19: The method of any of examples 1 to 18, wherein the physical configuration comprises a plurality of antenna elements that forms an antenna array pattern that corresponds to the physical configuration.

Example 20: The method of any of examples 1 to 19, wherein the physical configuration comprises a foldable state of the wireless device corresponding to different possible foldings of a flexible display unit.

Example 21: An apparatus comprising at least one means for performing a method of any of examples 1 to 20.

Example 22: An apparatus for wireless communications comprising a processor and memory coupled to the processor, the processor and memory configured to perform a method of any of examples 1 to 20.

Example 23: A non-transitory computer-readable medium storing code for wireless communications, the code comprising instructions executable by a processor to perform a method of any of examples 1 to 20.

Example 24: A method for wireless communications at a base station, comprising: receiving, from a wireless device, signaling comprising an indication of a physical configuration for the wireless device; receiving, from the wireless device, a request for channel information corresponding to the physical configuration for the wireless device; and transmitting, to the wireless device, the channel information in response to the request.

Example 25: The method of example 24, wherein transmitting the channel information further comprises: transmitting, to the wireless device, a plurality of contiguous channel state information reference signal (CSI-RS) resources, wherein the CSI-RS resources are determined based at least in part on the indication of the physical configuration for the wireless device.

Example 26: The method of example 25, further comprising: transmitting the plurality of contiguous CSI-RS resources on a beam that is specific to the physical configuration to the wireless device.

Example 27: The method of any of examples 24 to 26, wherein the indication of the physical configuration comprises an explicit or an implicit indication of the physical configuration relative to past physical configurations of the wireless device.

Example 28: The method of any of examples 24 to 27, wherein the indication of the physical configuration comprises an indication of antenna shapes, antenna subarrays, antenna dimensions, or a combination thereof for the physical configuration of the wireless device.

Example 29: The method of any of examples 24 to 28, wherein the indication of the physical configuration comprises a quantized indication with a finite size.

Example 30: The method of any of examples 24 to 29, wherein the indication of the physical configuration comprises information for a plurality of applications at a firmware layer, hardware layer, software layer, application layer, or a combination thereof for the wireless device.

Example 31: The method of any of examples 24 to 30, wherein the physical configuration comprises a plurality of antenna elements that forms an antenna array pattern that corresponds to the physical configuration.

Example 32: The method of any of examples 24 to 31, wherein the channel information is associated with beamformed communications with the wireless device.

Example 33: The method of any of examples 24 to 32, wherein the physical configuration comprises a foldable state of the wireless device corresponding to different possible foldings of a flexible display unit.

Example 34: An apparatus comprising at least one means for performing a method of any of examples 24 to 33.

Example 35: An apparatus for wireless communications comprising a processor and memory coupled to the processor, the processor and memory configured to perform a method of any of examples 24 to 33.

Example 36: A non-transitory computer-readable medium storing code for wireless communications, the code comprising instructions executable by a processor to perform a method of any of examples 24 to 33.

What is claimed is:

1. An apparatus for wireless communications at a wireless device, comprising:
   one or more memories; and
   one or more processors coupled with the one or more memories and configured to cause the wireless device to:
   transmit, to a network entity, signaling comprising an indication of a physical configuration of the wireless device and a request for channel information for a subsequent communication with the network entity, wherein the physical configuration of the wireless device comprises a physical configuration of a flexible display of the wireless device, and wherein an antenna array configuration used to transmit is based at least in part on the physical configuration of the wireless device;
   receive, from the network entity, the channel information in response to the request; and
   communicate, with the network entity, based at least in part on a beamforming codebook, wherein the beamforming codebook is based at least in part on the physical configuration of the wireless device and the channel information.

2. The apparatus of claim 1,
   wherein the antenna array configuration comprises a physical arrangement of one or more antenna arrays based at least in part on a state of the physical configuration of the flexible display.

3. The apparatus of claim 1, wherein the one or more processors are further configured to cause the wireless device to:
   determine one or more characteristics of one or more beams based at least in part on the beamforming codebook, wherein the one or more characteristics include a beamwidth, a direction, a gain in a certain direction, or a combination thereof for the one or more beams.

4. The apparatus of claim 1, wherein the one or more processors are further configured to cause the wireless device to:
   determine that the physical configuration of the flexible display comprises a foldable state of the flexible display; and
   determine whether the foldable state corresponds to a previous foldable state reported to the network entity.

5. The apparatus of claim 1, wherein the one or more processors are further configured to cause the wireless device to:
   determine that the physical configuration of the flexible display comprises an intermediate foldable state of the flexible display; and
   perform a codebook adaptation procedure based on the intermediate foldable state.

6. The apparatus of claim 1, wherein the one or more processors are further configured to cause the wireless device to:
   transmit, to the network entity, a message that indicates a current or upcoming physical configuration of the wireless device does not correspond to an a priori beamforming codebook.

7. The apparatus of claim 1, wherein the one or more processors are further configured to cause the wireless device to:
   transmit subsequent communications with the network entity while in the physical configuration of the wireless device, wherein the beamforming codebook is used for the subsequent communications.

8. The apparatus of claim 1, wherein the physical configuration of the wireless device fails to correspond to at least one beamforming codebook of the wireless device.

9. The apparatus of claim 8, wherein the one or more processors are further configured to cause the wireless device to:
   identify the physical configuration of the wireless device;
   access a plurality of beamforming codebooks available for the wireless device to use; and
   determine that the identified physical configuration fails to correspond to at least one beamforming codebook of the wireless device from the plurality of beamforming codebooks.

10. The apparatus of claim 9, wherein the one or more processors configured to cause the wireless device to access the plurality of beamforming codebooks are further configured to cause the wireless device to:
    access a plurality of pre-loaded beamforming codebooks in the one or more memories of the wireless device, wherein the plurality of pre-loaded beamforming codebooks is associated with beamformed communications over a number of radio frequency chains with the network entity, wherein the number of radio frequency chains is smaller than a number of antenna elements of the wireless device, and wherein the plurality of pre-loaded beamforming codebooks is stored in radio frequency integrated circuit (RFIC) memory.

11. The apparatus of claim 1, wherein the indication of the physical configuration comprises:
    an explicit or an implicit indication of the physical configuration of the wireless device relative to past physical configurations of the wireless device;
    an indication of one or more antenna shapes, antenna subarrays, antenna dimensions, or a combination thereof for the physical configuration of the wireless device;
    a quantized indication with a finite size; or
    information for a plurality of applications at a firmware layer, hardware layer, software layer, application layer, or a combination thereof for the wireless device.

12. The apparatus of claim 1, wherein the one or more processors are further configured to cause the wireless device to:
  transmit, to a modem and a radio frequency integrated circuit associated with the modem in the wireless device, an indication of the beamforming codebook.

13. The apparatus of claim 1, wherein the one or more processors are further configured to cause the wireless device to:
  transmit, to the network entity, a beam refinement procedure request based at least in part on the beamforming codebook for the physical configuration of the wireless device, wherein the beam refinement procedure request comprises the request for channel information.

14. The apparatus of claim 1, wherein the one or more processors are further configured to cause the wireless device to:
  deactivate one or more antennas based at least in part on the physical configuration of the wireless device.

15. The apparatus of claim 1, wherein the physical configuration of the wireless device comprises a plurality of antenna elements that forms an antenna array pattern that corresponds to the physical configuration of the wireless device or a foldable state of the wireless device corresponding to one or more folding states of the flexible display.

16. An apparatus for wireless communications at a wireless device, comprising:
  one or more memories; and
  one or more processors coupled with the one or more memories and configured to cause the wireless device to:
    transmit, to a network entity, signaling comprising an indication of a physical configuration of the wireless device and a request for channel information for a subsequent communication with the network entity, the channel information comprising a plurality of contiguous channel state information reference signal (CSI-RS) resources, wherein an antenna array configuration used to transmit is based at least in part on the physical configuration of the wireless device;
    receive, from the network entity, the channel information in response to the request; and
    communicate, with the network entity, based at least in part on a beamforming codebook, wherein the beamforming codebook corresponding to the physical configuration is based at least in part on the plurality of contiguous CSI- RS resources.

17. The apparatus of claim 16, wherein the one or more processors are further configured to cause the wireless device to:
  use a plurality of sets of analog sampling beams over the plurality of contiguous CSI-RS resources to determine the beamforming codebook corresponding to the physical configuration of the wireless device.

18. An apparatus for wireless communications at a wireless device, comprising:
  one or more memories; and
  one or more processors coupled with the one or more memories and configured to cause the wireless device to:
    transmit, to a network entity, signaling comprising an indication of a physical configuration of the wireless device and a request for channel information for a subsequent communication with the network entity, wherein an antenna array configuration used to transmit is based at least in part on the physical configuration of the wireless device;
    receive, from the network entity, the channel information in response to the request;
    transmit, to a central processing unit (CPU) within the wireless device, sensor information regarding the physical configuration;
    generate, at the CPU, a beamforming codebook corresponding to the physical configuration based at least in part on the sensor information; and
    communicate, with the network entity, based at least in part on the beamforming codebook while in the physical configuration.

19. The apparatus of claim 18, wherein the sensor information comprises information from a potentiometer, a gyro, or a combination thereof.

20. An apparatus for wireless communications at a network entity, comprising:
  one or more memories; and
  one or more processors coupled with the one or more memories and configured to cause the network entity to:
    obtain signaling comprising an indication of a physical configuration of a wireless device and a request for channel information for a subsequent communication with the network entity;
    output the channel information in response to the request; and
    communicate based at least in part on a beamforming codebook, wherein the beamforming codebook is based at least in part on the physical configuration of the wireless device and the channel information.

21. The apparatus of claim 20, wherein the one or more processors are further configured to cause the network entity to:
  receive, from the wireless device, a message that indicates a current or upcoming physical configuration of the wireless device does not correspond to an a priori beamforming codebook.

22. The apparatus of claim 20, wherein the one or more processors are further configured to cause the network entity to:
  receive, from the wireless device, a request for the network entity to allocate a plurality of contiguous channel state information reference signal (CSI-RS) resources, wherein the beamforming codebook corresponding to the physical configuration is based at least in part on the plurality of contiguous CSI-RS resources.

23. The apparatus of claim 20, wherein the physical configuration of the wireless device comprises a physical configuration of a flexible display of the wireless device.

24. A method for wireless communications at a wireless device, comprising:
  transmitting, to a network entity, signaling comprising an indication of a physical configuration of the wireless device and a request for channel information for a subsequent communication with the network entity, the physical configuration of the wireless device comprising a physical configuration of a flexible display of the wireless device, wherein an antenna array configuration used for the transmitting is based at least in part on the physical configuration of the wireless device;
  receiving, from the network entity, the channel information in response to the request; and
  communicating, with the network entity, based at least in part on a beamforming codebook, wherein the beamforming codebook is based at least in part on the physical configuration of the wireless device and the channel information.

25. The method of claim 24, wherein the antenna array configuration comprises a physical arrangement of one or more antenna arrays based at least in part on a state of the physical configuration of the flexible display.

26. The method of claim 24, further comprising:
determining one or more characteristics of one or more beams based at least in part on the beamforming codebook, wherein the one or more characteristics include a beamwidth, a direction, a gain in a certain direction, or a combination thereof for the one or more beams.

27. The method of claim 24, further comprising:
determining that the physical configuration of the wireless device comprises a foldable state of the flexible display; and
determining whether the foldable state corresponds to a previous foldable state reported to the network entity.

28. The method of claim 24, further comprising:
determining that the physical configuration of the flexible display comprises an intermediate foldable state of the flexible display; and
performing a codebook adaptation procedure based on the intermediate foldable state.

29. The method of claim 24, further comprising:
transmitting, to the network entity, a message indicating that a current or upcoming physical configuration of the wireless device does not correspond to an a priori beamforming codebook.

30. The method of claim 24, further comprising:
transmitting, to the network entity, a request for the network entity to allocate a plurality of contiguous channel state information reference signal (CSI-RS) resources, wherein the beamforming codebook corresponding to the physical configuration of the wireless device is based at least in part on the plurality of contiguous CSI-RS resources.

31. The method of claim 30, further comprising:
using a plurality of sets of analog sampling beams over the plurality of contiguous CSI-RS resources to determine the beamforming codebook corresponding to the physical configuration of the wireless device.

32. A method for wireless communications at a network entity, comprising:
obtaining signaling comprising an indication of a physical configuration of a wireless device and a request for channel information for a subsequent communication with the network entity;
outputting the channel information in response to the request; and
communicating based at least in part on a beamforming codebook, wherein the beamforming codebook is based at least in part on the physical configuration of the wireless device and the channel information.

33. The method of claim 32, further comprising:
receiving, from the wireless device, a message indicating that a current or upcoming physical configuration of the wireless device does not correspond to an a priori beamforming codebook.

34. The method of claim 32, further comprising:
receiving, from the wireless device, a request for the network entity to allocate a plurality of contiguous channel state information reference signal (CSI-RS) resources, wherein the beamforming codebook corresponding to the physical configuration is based at least in part on the plurality of contiguous CSI-RS resources.

35. The method of claim 32, wherein the physical configuration of the wireless device comprises a physical configuration of a flexible display of the wireless device.

36. A non-transitory computer-readable medium storing code for wireless communications at a wireless device, the code comprising instructions executable by one or more processors to cause the wireless device to:
transmit, to a network entity, signaling comprising an indication of a physical configuration of the wireless device and a request for channel information for a subsequent communication with the network entity, wherein the physical configuration of the wireless device comprises a physical configuration of a flexible display of the wireless device, and wherein an antenna array configuration used to transmit is based at least in part on the physical configuration of the wireless device;
receive, from the network entity, the channel information in response to the request; and
communicate, with the network entity, based at least in part on a beamforming codebook, wherein the beamforming codebook is based at least in part on the physical configuration of the wireless device and the channel information.

37. The non-transitory computer-readable medium of claim 36, wherein the antenna array configuration comprises a physical arrangement of one or more antenna arrays based at least in part on a state of the physical configuration of the flexible display.

38. A non-transitory computer-readable medium storing code for wireless communications at a network entity, the code comprising instructions executable by one or more processors to cause the network entity to:
obtain signaling comprising an indication of a physical configuration of a wireless device and a request for channel information for a subsequent communication with the network entity;
output the channel information in response to the request; and
communicate based at least in part on a beamforming codebook, wherein the beamforming codebook is based at least in part on the physical configuration of the wireless device and the channel information.

39. The non-transitory computer-readable medium of claim 38, wherein the instructions are further executable by the one or more processors to cause the network entity to:
receive, from the wireless device, a message indicating that a current or upcoming physical configuration of the wireless device does not correspond to an a priori beamforming codebook.

40. An apparatus for wireless communications at a wireless device, comprising:
one or more memories; and
one or more processors coupled with the one or more memories and configured to cause the wireless device to:
transmit, to a network entity, signaling comprising an indication of a physical configuration of the wireless device and a request for channel information for a subsequent communication with the network entity, wherein the transmission is based at least in part on the physical configuration of the wireless device which fails to correspond to at least one analog beamforming codebook of the wireless device, and wherein the physical configuration comprises a foldable state of the wireless device corresponding to different possible foldings of a flexible display unit; and receive, from the network entity, the channel information in response to the request.

41. The apparatus of claim 40, wherein the one or more processors are further configured to cause the wireless device to:

identify the physical configuration of the wireless device;

access a plurality of analog beamforming codebooks available for the wireless device to use; and determine the identified physical configuration fails to correspond to at least one analog beamforming codebook of the wireless device from the plurality of analog beamforming codebooks, wherein the one or more processors configured to cause the wireless device to access the plurality of analog beamforming codebooks are further configured to cause the wireless device to:

access a plurality of pre-loaded analog beamforming codebooks in the one or more memories of the wireless device, wherein the plurality of pre-loaded analog beamforming codebooks is associated with beamformed communications over a limited number of radio frequency chains with the network entity, and wherein the number of radio frequency chains is smaller than a number of antenna elements of the wireless device.

42. The apparatus of claim 40, wherein the request for channel information for the subsequent communication with the network entity comprises a request for a plurality of contiguous channel state information reference signal (CSI-RS) resources for an analog beamforming codebook determination, and wherein the one or more processors are further configured to cause the wireless device to:

receive, from the network entity, the plurality of contiguous CSI-RS resources;

determine an analog beamforming codebook corresponding to the physical configuration based at least in part on the plurality of contiguous CSI-RS resources, wherein the analog beamforming codebook is used for the subsequent communication with the network entity while in the physical configuration; and use a plurality of sets of analog sampling beams over the plurality of contiguous CSI-RS resources to determine the analog beamforming codebook corresponding to the physical configuration.

43. The apparatus of claim 40, wherein the indication of the physical configuration comprises an explicit or an implicit indication of the physical configuration relative to past physical configurations of the wireless device.

44. The apparatus of claim 40, wherein the indication of the physical configuration comprises information for a plurality of applications at a firmware layer, hardware layer, software layer, application layer, or a combination thereof for the wireless device.

45. The apparatus of claim 40, wherein the one or more processors are further configured to cause the wireless device to:

deactivate one or more antennas based at least in part on the physical configuration.

46. An apparatus for wireless communications at a network entity, comprising:

one or more memories; and one or more processors coupled with the one or more memories and configured to cause the network entity to:

receive, for a wireless device, signaling comprising an indication of a physical configuration for the wireless device, wherein the physical configuration comprises a foldable state of the wireless device corresponding to different possible foldings of a flexible display unit;

receive, for the wireless device, a request for channel information corresponding to the physical configuration for the wireless device; and transmit, for the wireless device, the channel information in response to the request.

47. The apparatus of claim 46, wherein the one or more processors configured to cause the network entity to transmit the channel information are further configured to cause the network entity to:

transmit, to the wireless device, a plurality of contiguous channel state information reference signal (CSI-RS) resources, wherein the plurality of contiguous CSI-RS resources are determined based at least in part on the indication of the physical configuration for the wireless device; and transmit the plurality of contiguous CSI-RS resources on a beam that is specific to the physical configuration to the wireless device.

48. The apparatus of claim 46, wherein the indication of the physical configuration comprises an explicit or an implicit indication of the physical configuration relative to past physical configurations of the wireless device.

49. The apparatus of claim 46, wherein the indication of the physical configuration comprises a quantized indication with a finite size.

50. The apparatus of claim 46, wherein the indication of the physical configuration comprises information for a plurality of applications at a firmware layer, hardware layer, software layer, application layer, or a combination thereof for the wireless device.

51. The apparatus of claim 46, wherein the physical configuration comprises a plurality of antenna elements that forms an antenna array pattern that corresponds to the physical configuration.

* * * * *